US008080163B2

(12) United States Patent  
Moller et al.

(10) Patent No.: US 8,080,163 B2
(45) Date of Patent: Dec. 20, 2011

(54) WATER TREATMENT METHOD

(75) Inventors: Gregory Moller, Moscow, ID (US); Remembrance Newcombe, Hayden, ID (US)

(73) Assignees: Blue Water Technologies, Inc., Hayden Lake, ID (US); Idaho Research Foundation, Inc., Moscow, ID (US)

( * ) Notice: Subject to any disclaimer, the term of this patent is extended or adjusted under 35 U.S.C. 154(b) by 603 days.

(21) Appl. No.: 11/627,880

(22) Filed: Jan. 26, 2007

(65) Prior Publication Data

US 2007/0187329 A1 Aug. 16, 2007

Related U.S. Application Data

(63) Continuation-in-part of application No. 11/171,002, filed on Jun. 29, 2005, now Pat. No. 7,445,721, and a continuation-in-part of application No. 10/727,963, filed on Dec. 3, 2003, now Pat. No. 7,399,416.

(60) Provisional application No. 60/763,540, filed on Jan. 30, 2006, provisional application No. 60/583,979, filed on Jun. 30, 2004, provisional application No. 60/430,756, filed on Dec. 4, 2002.

(51) Int. Cl.
*C02F 1/28* (2006.01)
(52) U.S. Cl. ........ 210/667; 210/669; 210/676; 210/679; 210/792; 210/804; 210/805; 210/806; 210/807
(58) Field of Classification Search .................. 210/676, 210/679, 683, 688, 906, 912, 667, 669, 713, 210/792, 804–807
See application file for complete search history.

(56) References Cited

U.S. PATENT DOCUMENTS

| | | | |
|---|---|---|---|
| 2,528,099 A | 10/1950 | Wilcox et al. |
| 2,696,462 A | 12/1954 | Bodkin |
| 2,730,239 A | 1/1956 | Peery |
| 2,863,829 A | 12/1958 | Henke et al. |
| 3,056,743 A | 10/1962 | Eichhorn et al. |
| 3,499,837 A | 3/1970 | Jaunarajs |
| 3,537,582 A | 11/1970 | Demeter |
| 3,619,425 A | 11/1971 | Palaiseau et al. |
| 3,674,684 A | 7/1972 | Gollan |
| 3,679,581 A | 7/1972 | Kunz |
| 3,959,133 A | 5/1976 | Fulton |
| 4,003,832 A | 1/1977 | Henderson et al. |
| 4,049,545 A | 9/1977 | Horvath |

(Continued)

FOREIGN PATENT DOCUMENTS

DE 2724254 11/1978

(Continued)

OTHER PUBLICATIONS

Beltran, "Heterogeneous Catalytic Ozonation," Ozone Reaction Kinetics for Water and Wastewater Systems, Chapter 10, Lewis Publishers, 2004, pp. 227-276.

(Continued)

*Primary Examiner* — Matthew Savage
(74) *Attorney, Agent, or Firm* — Paul W. Mitchell

(57) ABSTRACT

Exemplary systems and methods for treating contaminated water are described. In one instance a method supplies metal salt reagents to a moving media filter in the presence of contaminated water. The method also introduces a waste stream resulting from the moving media filter upstream of the moving media filter effective to lower an average contaminant concentration of effluent water from the moving media filter.

5 Claims, 10 Drawing Sheets

U.S. PATENT DOCUMENTS

| | | | |
|---|---|---|---|
| 4,126,546 | A | 11/1978 | Hjelmner et al. |
| 4,145,280 | A | 3/1979 | Middelbeek et al. |
| 4,269,716 | A | 5/1981 | Gurian |
| 4,366,128 | A | 12/1982 | Weir et al. |
| 4,448,696 | A | 5/1984 | White, Jr. |
| 4,689,154 | A | 8/1987 | Zimberg |
| 4,732,879 | A | 3/1988 | Kalinowski et al. |
| 4,842,744 | A | 6/1989 | Schade |
| 5,087,374 | A | 2/1992 | Ding |
| 5,102,556 | A | 4/1992 | Wong |
| 5,173,194 | A | 12/1992 | Hering, Jr. |
| 5,190,659 | A | 3/1993 | Wang et al. |
| 5,236,595 | A | 8/1993 | Wang et al. |
| 5,302,356 | A | 4/1994 | Shadman et al. |
| 5,304,309 | A | 4/1994 | Sengupta |
| 5,369,072 | A | 11/1994 | Benjamin et al. |
| 5,372,720 | A | 12/1994 | Jonsson |
| 5,439,595 | A | 8/1995 | Downey, Jr. |
| 5,443,729 | A | 8/1995 | Sly et al. |
| 5,454,959 | A | 10/1995 | Stevens |
| 5,534,153 | A | 7/1996 | Scott et al. |
| 5,573,666 | A | 11/1996 | Korin |
| 5,670,046 | A | 9/1997 | Kimmel |
| 5,674,402 | A | 10/1997 | Nilsson et al. |
| 5,676,257 | A | 10/1997 | Adkins |
| 5,679,257 | A | 10/1997 | Coate et al. |
| 5,707,528 | A | 1/1998 | Berry |
| 5,746,913 | A | 5/1998 | Chang et al. |
| 5,755,977 | A | 5/1998 | Gurol et al. |
| 5,843,308 | A | 12/1998 | Suozzo et al. |
| 5,855,787 | A | 1/1999 | Gioro |
| 5,876,606 | A | 3/1999 | Blowes et al. |
| 5,904,855 | A | 5/1999 | Manz et al. |
| 5,911,882 | A | 6/1999 | Benjamin et al. |
| 6,077,446 | A | 6/2000 | Steiner et al. |
| 6,132,623 | A | 10/2000 | Nikolaidis et al. |
| 6,143,186 | A | 11/2000 | Van Unen |
| 6,200,482 | B1 | 3/2001 | Winchester et al. |
| 6,217,765 | B1 | 4/2001 | Yamasaki et al. |
| 6,319,412 | B1 | 11/2001 | Reyna |
| 6,334,956 | B1 | 1/2002 | Hanemaaijer |
| 6,387,264 | B1 | 5/2002 | Baur |
| 6,426,005 | B1 | 7/2002 | Larsson |
| 6,432,312 | B1 | 8/2002 | Fuss |
| 6,464,877 | B1 | 10/2002 | Mori et al. |
| 6,468,942 | B1 | 10/2002 | Sansalone |
| 6,471,857 | B1 | 10/2002 | Kaibara |
| 6,495,047 | B1 | 12/2002 | SenGupta et al. |
| 6,630,071 | B1 | 10/2003 | Buisman et al. |
| 6,663,781 | B1 | 12/2003 | Huling et al. |
| 6,716,344 | B1 | 4/2004 | Bassi et al. |
| 6,942,786 | B1 | 9/2005 | Fosseng |
| 6,942,807 | B1 | 9/2005 | Meng et al. |
| 6,982,036 | B2 | 1/2006 | Johnson |
| 7,029,589 | B2 | 4/2006 | McGinness |
| 7,399,416 | B2 | 7/2008 | Moller et al. |
| 7,445,721 | B2 | 11/2008 | Moller |
| 7,713,423 | B2 | 5/2010 | Moller et al. |
| 7,713,426 | B2 | 5/2010 | Newcombe |
| 7,744,764 | B2 | 6/2010 | Moller et al. |
| 2001/0052495 | A1 | 12/2001 | Friot |
| 2002/0003116 | A1 | 1/2002 | Golden |
| 2002/0077249 | A1 | 6/2002 | Schlegel et al. |
| 2002/0088759 | A1* | 7/2002 | Krulik et al. ............ 210/723 |
| 2004/0144728 | A1 | 7/2004 | Moller et al. |
| 2004/0188348 | A1 | 9/2004 | Yamasaki et al. |
| 2004/0222162 | A1 | 11/2004 | Lee et al. |
| 2005/0127003 | A1 | 6/2005 | Dennis |
| 2005/0173348 | A1 | 8/2005 | Drake |
| 2005/0263447 | A1 | 12/2005 | McGrew, Jr. |
| 2006/0000784 | A1 | 1/2006 | Khudenko |
| 2006/0000785 | A1 | 1/2006 | Moller |
| 2007/0136919 | P1 | 6/2007 | Bak et al. |
| 2007/0163958 | A1 | 7/2007 | Newcombe |
| 2007/0187329 | A1 | 8/2007 | Moller et al. |

FOREIGN PATENT DOCUMENTS

| | | |
|---|---|---|
| GB | 471277 | 9/1937 |
| GB | 1596205 | 8/1981 |
| JP | 03137990 | 6/1991 |
| JP | 7-232161 | 5/1995 |
| JP | 2001-070954 | 3/2001 |
| JP | 2002-159977 | 4/2002 |
| WO | WO0110786 | 2/2001 |
| WO | WO2004050561 | 6/2004 |

OTHER PUBLICATIONS

Ravikumar, et al., "Chemical Oxidation of Chlorinated Organics by Hydrogen Peroxide in the Presence of Sand," Environ. Sci. Technol., 1994, 28, pp. 394-400.

Arai, Y. et al., "ATR-FTIR Spectroscopic Investigation on Phosphate Adsorption Mechanisms at the Ferrihydrite-Water Interface", *J. Colloid Interface Sci*. Retrieved from http://ag.udel.edu/soilchem/arai01bjcis.pdf 2001, pp. 241, 317-326.

Benjamin, Mark M. et al., "Sorption and Filtration of Metals Using Iron-Oxide-Coated Sand", May 1, 1996, pp. 1-13.

Gustafsson, John P., "Modelling Molybdate and Tungstate Adsorption to Ferrihydrite", *Chemical Geology*— vol. 200, Issues 1-2, Oct. 16. 2003 Retrieved from <<http:www.sciencedirect.com/science?_ob=ArticleURL&_udi=B6V5Y-48TMHH4-3&_user=10&_rdoc=1&_fmt=&_orig=search&_sort=d&_docanchor=&view=c&_searchStrId=1066144960&_rerunOrigin=goggle&_acct=C000050221&_version=1&_urlVersion=0&_userid=10&md5=3a Jul. 11, 2003, pp.. 105-115.

Gustafsson, John P., "Visual MINTEQ. MINTEQA2 4.0", *Royal Institution of Technology Land and Water Resources Engineeering*; Stockholm, Sweden 2006.

International Organization for, Standardization, "Water Quality— Determination of Nitrogen—Part 2: Determination of Bound Nitrogen, After Combustion and Oxidation to Nitrogen Dioxide, Chemiluminescence Detection", *ISOm 11905-2; Geneva, Switzerland* Retrieved from <<http://www.saiglobal.com/PDFTemp/Previews/OSH/ISO/ISO_12345_03-01/T023630E.PDF>> Mar. 15, 1997, pp. 1-5.

Ivanov, V. et al., "Phosphate Removal from the Returned Liquor of Municipal Wastewater Treatment Plant Using Iron-Reducing Bacteria", *J. Appl. Microbiol* 2005, p. 98, 1152-1161.

Jenkins, D., "Chemical Processes for Phosphate Removal", *Water Res*. Retrieved from <<http://books.google.com/books?id=bBSRPv87Ms8C&pg=PA94&lpg=PA94&dq=%22chemical+processes+for+phosphate+removal%22&source=bl&ots=kVPUAz08Jp&sig=keK-5nOkxZZdx4itR2_Jd_YNcfE&hl=en&ei=gF7SsCCLpCMtAPEz9ilBQ&sa=X&oi=book_result&ct=result&resnum=1991, pp. 5, 369-387.

Joshi, Arun et al., "Removal of Arsenic from Ground Water by Iron Oxide-Coated Sand", Aug. 1, 1996, pp. 1-4.

Khare, N. et al., "Xanes Determination of Adsorbed Phosphate Distribution between Ferrihydrite and Boehmite in Mixtures", *Published in Soil Sci. Soc. Am. J. 68:460-469 (2004)*. Retrieved from <<http://soil.scijournals.org/cgi/content/abstract/68/2/460>> 2004, pp. 68, 460-469.

Leaf, Williamet al., "Evaluation of Blue PRO Process at the Hayden Waste-water Research Facility—Final Summary Report No. 331243. 01.RP", *CH2M Hill*; Denver, CO, July Retrieved from <<http://cforjustice.org/wp-content/uploads/2008/12/hayden-3rd-party-blue-pro-report.pdf >> Jul. 12, 2006, pp. 1-21.

Lo, Shang-Lien et al., "Characteristics and Adsorption Properties of Iron-Coated Sand", pp. 1-9.

Lovley, Derek. R. et al., "Organic Matter Mineralization with Reduction of Ferric Iron in Anaerobic Sediments", *Applied and Environmental Microbiology*, Apr. 1986 Retrieved from <<http://www.ncbi.nlm.nih.gov/pmc/articles/PMC238947/pdf/aem00139-0019.pdf>> Apr. 1986, pp. 51, 683-689.

Matott, L. S., "IsoFit Version 1.0", *State University of New York at Buffalo* 2004.

Meima, J. A. et al., "Application of Surface Complexation/Precipitation Modeling to Contaminant Leaching from Weathered Municipal Solid Waste Incinerator Bottom Ash", *Environ. Sci. Technol.* 1998, pp. 32, 688-693.

Newcombe, R. L. et al., "Arsenic Removal from Drinking Water by Moving Bed Active Filtration", *J. Environ. Eng.* 2006, pp. 132, 5-12.

Newcombe, R.L. et al., "Phosphorus Removal from Municipal Wastewater by Hydrous Ferric Oxide Reactive Filtration and Coupled Chemically Enhanced Secondary Treatment: Part I—Performance", Mar. 1, 2008, pp. 1-9.

Newcombe, R. L. et al., "Phosphorus Removal from Municipal Wastewater by Hydrous Ferric Oxide Reactive Filtration and Coupled Chemically Enhanced Secondary Treatment: Part II—Mechanism", Mar. 1, 2008.

Nowack, Bernd et al., "Modeling the Adsorption of Metal-EDTA Complexes onto Oxides", *Environ. Sci. Technol*. Retrieved from <<http://www.empa.ch/plugin/template/empa/*/78480/---/l=2 >> 1996, pp. 30, 2397-2405.

Parfitt, R. L. et al., "The Mechanism of Phosphate Gixation by Iron Oxides", *Soil Sci. Soc. Am. Proc.* 1975, pp. 39, 837-841.

Parker, Denny S. et al., "The Future of Chemically Enhanced Primary Treatment: Evolution Not Revolution", Retrieved from <<http://www.cd3wd.com/cd3wd_40/ASDB_SMARTSAN/CEPT-Debate-2.pdf >> Mar. 15, 2001.

Pestovsky, Oleg et al., "Aqueous Ferryl(IV) Ion: Kinetics of Oxygen Atom Transfer to Substrates and Oxo Exchange with Solvent water", *Inorganic Chemistry Article; Inorg. Chem. 2006, 45, 814-820* Oct. 27, 2005, pp. 814-820.

Schwertman, U. et al., "Iron Oxides in the Laboratory: Preparation and Characterization", *Wiley-VCH: Weinheim, Hermany* 2000.

Sigg, L. et al., "The Interaction of Anions and Weak Acids with the Hydrous Goethite Surface", *Colloids Surf.* 1980, pp. 2, 101-107.

Smith, S. et al., "The Significance of Chemical Phosphorus Removal Theory for Engineering Practice", 2007, pp. 1-24.

Stabnikov, V. P. et al., "Effect of Iron Hydroxide on Phosphate Removal During Anaerobic Digestion of Actiavted Sludge", *Appl. Biochem. Microbiol.* 2004, pp. 40, 376-380.

Thirunavukkarasu, O. S. et al., "Removal of Arsenic in Drinking Water by Iron Oxide-Coated Sand and Ferrihydrite—Batch Studies", pp. 1-17.

Wouter, "Effluent polishing at Sewage Works Ruurlo and Wehl, The Netherlands", "H2O", 1999, Unknown, #19, The Netherlands.

Basibuyuk, M. et al.; "Use of waterworks sludge, ferric chloride and alum for the treatment of paper mill wastewater"; *Asian Journal of Chemistry*; vol. 16, No. 1; 2004; pp. 103-112.

Basibuyuk, M. et al.; "The use of waterworks sludge for the treatment of dye wastes"; *Environmental Technology*; vol. 23, No. 3; 2002; pp. 345-351.

Dzombak, D. A. et al., *Surface Complexation Modeling*, 1990; John Wiley & Sons; New York, NY.

Genz, A. et al.; "Advanced phosphorus removal from membrane filtrates by adsorption on activated aluminium oxide and granulated ferric hydroxide"; *Water Research*; vol. 38, No. 16; 2004; pp. 3523-3530.

Gnirss, R. et al.; "Cost effective and advanced phosphorus removal in membrane bioreactors for a decentralized wastewater technology"; *Water Science and Technology*; vol. 47, No. 12; 2003; pp. 133-139.

Gregory, J. et al.; "Hydrolyzing metal salts as coagulants"; *Pure and Applied Chemistry*; vol. 73, No. 12; 2001; pp. 2017-2026.

Guven, E.; "Granulation in Thermophilic Aerobic Wastewater Treatment"; Ph.D. Dissertation; Marquette University; 2004.

Hermanowicz, S. W., "Chemical Phosphate Removal", *Biological and Chemical Systems for Nutrient Removal*; Water Environment Federation: Alexandria, Virginia. 1998, pp. 39-57.

Kornmuller, A. et al.; "Adsorption of reactive dyes to granulated iron hydroxide and its oxidative regeneration"; *Water Science and Technology*; vol. 46, No. 4-5; 2002; pp. 43-50.

Lee, J.W. et al.; "Comparative studies on coagulation and adsorption as a pretreatment method for the performance improvement of submerged MF membrane for secondary domestic wastewater treatment"; *Separation Science and Technology*; vol. 40, No. 13; 2005; pp. 2613-2632.

Lijklema, L.; "Interaction Of Ortho-Phosphate With Iron(III) and Aluminum Hydroxides"; *Environmental Science & Technology*; vol. 14, No. 5; 1980; pp. 537-541.

Robertson, W.D.; "Treatment of wastewater phosphate by reductive dissolution of iron"; *Journal of Environmental Quality*; vol. 29, No. 5; 2000; pp. 1678-1685.

Sari, B. et al.; "Use of fly ash as a potential coagulant in the physicochemiical treatment of domestic wastewater"; *Turkish Journal of Engineering and Environmental Sciences*; vol. 26, No. 2; 2002; pp. 65-74.

Shon, H.K. et al.; "Effect of partial flocculation and adsorption as pretreatment to ultrafiltration"; *AIChE Journal*; vol. 52, No. 1; 2006; pp. 207-216.

Shon, H.K. et al.; "Is semi-flocculation effective as pretreatment to ultrafiltration in wastewater treatment?"; *Water Research*; vol. 39, No. 1; Jan. 2005; pp. 147-153.

Xu, G.R., et al.; "Adsorbent obtained from CEPT sludge in wastewater chemically enhanced treatment"; *Water Research*; vol. 39, No. 20; Dec. 2005; pp. 5175-5185.

Zeng, L. et al.; "Adsorptive removal of phosphate from aqueous solutions using iron oxide tailings"; *Water Research*; vol. 38, No. 5; Mar. 2004; pp. 1318-1326.

PCT Application PCT/US03/40056; International Search Report dated Apr. 27, 2004.

EPO Application 07001983.1; Search and Examination Report dated Mar. 11, 2008.

EPO Application 03799926.5; Examination Report dated Feb. 22, 2006.

Jiang, J.Q. et al.; "Pre-polymerised inorganic coagulants and phosphorus removal by coagulation—A review"; *Water SA*; vol. 24, No. 3; Jul. 3, 1998; 2pp. 237-244.

* cited by examiner

WATER TREATMENT METHOD

CROSS-REFERENCE TO RELATED APPLICATIONS

The present patent application claims priority to U.S. Provisional Patent Application No. 60/763,540, filed Jan. 30, 2006 and entitled "Water Treatment System and Method." The present patent application is also a continuation-in-part of, and claims priority from, U.S. patent application Ser. No. 10/727,963, filed Dec. 3, 2003 and entitled "Reactive Filtration", now U.S. Pat. No. 7,399,416, which claims the benefit of U.S. Provisional Patent Application 60/430,756, filed Dec. 4, 2002. The present patent application is also a continuation-in-part of, and claims priority from, U.S. patent application Ser. No. 11/171,002, filed Jun. 29, 2005 and entitled "Reactive Filtration", now U.S. Pat. No. 7,445,721, which claims the benefit of U.S. Provisional Patent Application 60/583,979, filed Jun. 30, 2004. The disclosures of the above mentioned patent applications are incorporated herein by reference in their entireties.

BACKGROUND

Various techniques are known for removing contaminants from water streams, such as waste water streams and drinking water streams. However, these techniques are often uneconomical to employ and/or lack a desired efficacy.

BRIEF DESCRIPTION OF THE DRAWINGS

Features and advantages of the described implementations can be more readily understood by reference to the following description taken in conjunction with the accompanying drawings.

The accompanying drawings illustrate exemplary embodiments of the present application.

Like reference numbers and designations in the various drawings are used wherever feasible to indicate like elements.

DETAILED DESCRIPTION

Overview

The present application describes a process and system for water treatment that involves recycling a tertiary process waste stream back into a water stream to be treated. "Water", "wastewater", or "water stream" as used herein means any water to be treated. The water is not necessarily highly contaminated water and may contain only trace amounts of a contaminant or contaminants, such as phosphorus, arsenic and/or other contaminants (organic, inorganic, biological, or radiological).

In one instance, the tertiary process includes a reactive filtration process that passes water to be treated through a moving bed media filter in the presence of metal salt reagents and/or derivatives thereof. Contaminants from the water are removed in a reject waste stream that also includes metal salt residuals. Recycling of the rejects with associated metal salt residuals back into the water stream upstream from the reactive filtration process enhances overall system contaminant removal efficiency. Stated another way, the contaminant concentration of water treated after the recycling process commences tends to be less than the contaminant concentrations prior to the recycling.

The described systems and methods are relatively economical to employ and maintain while offering relatively high operational robustness and system stability. For example, various implementations provide an economical process to remove phosphorus, arsenic, selenium, metal, and/or other contaminants from water or wastewater. At least some of these implementations can reduce contaminant concentrations in the resultant effluent water to very low levels (e.g., a few parts per billion) where desired. The described concepts can be implemented in new water processing systems or can be conveniently applied to existing water processing systems.

Exemplary Systems

Figure 1:
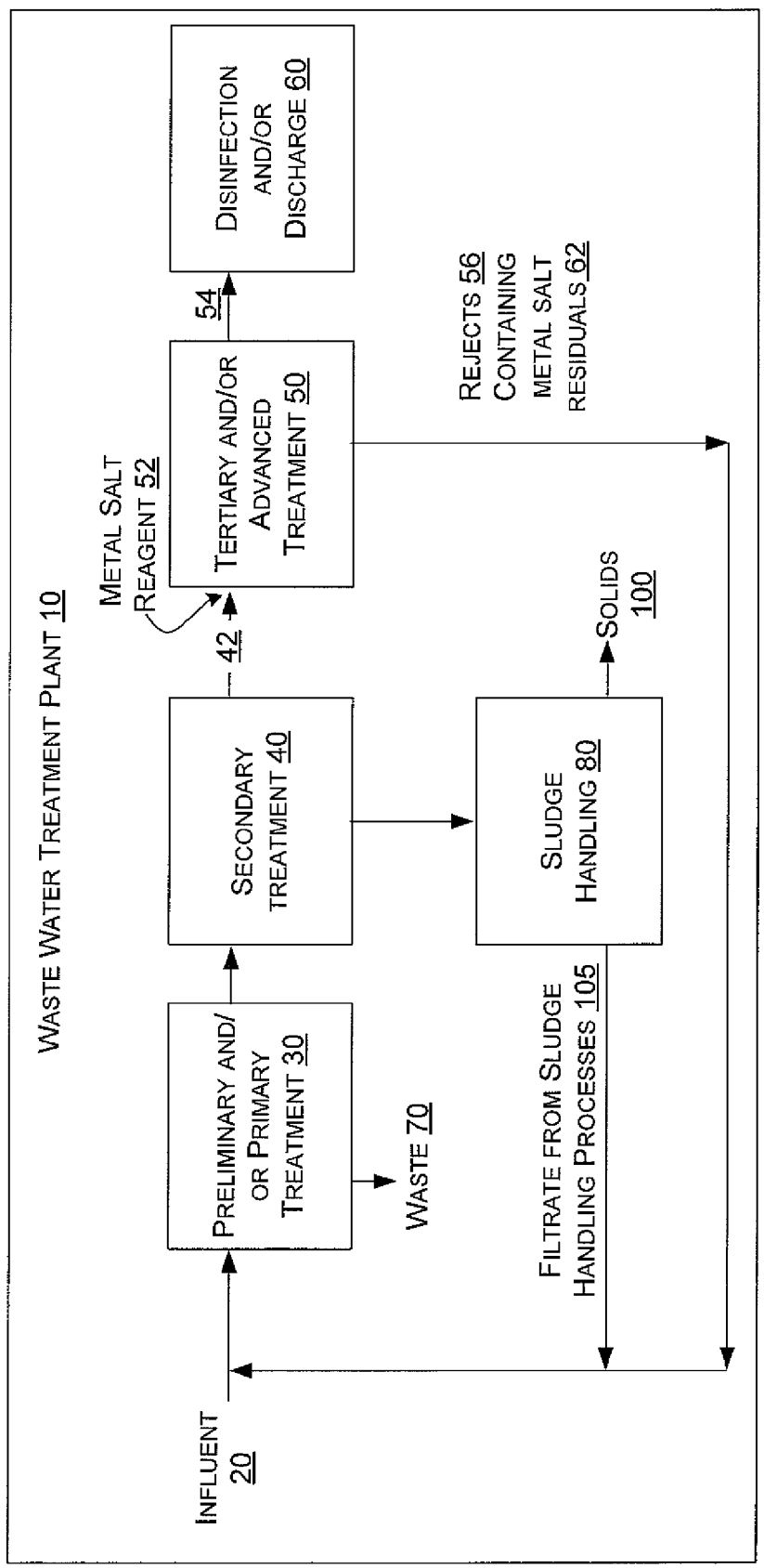
FIGS. 1-5 illustrate wastewater-treatment systems that may be used to implement various embodiments of the present application.
Figure 2:
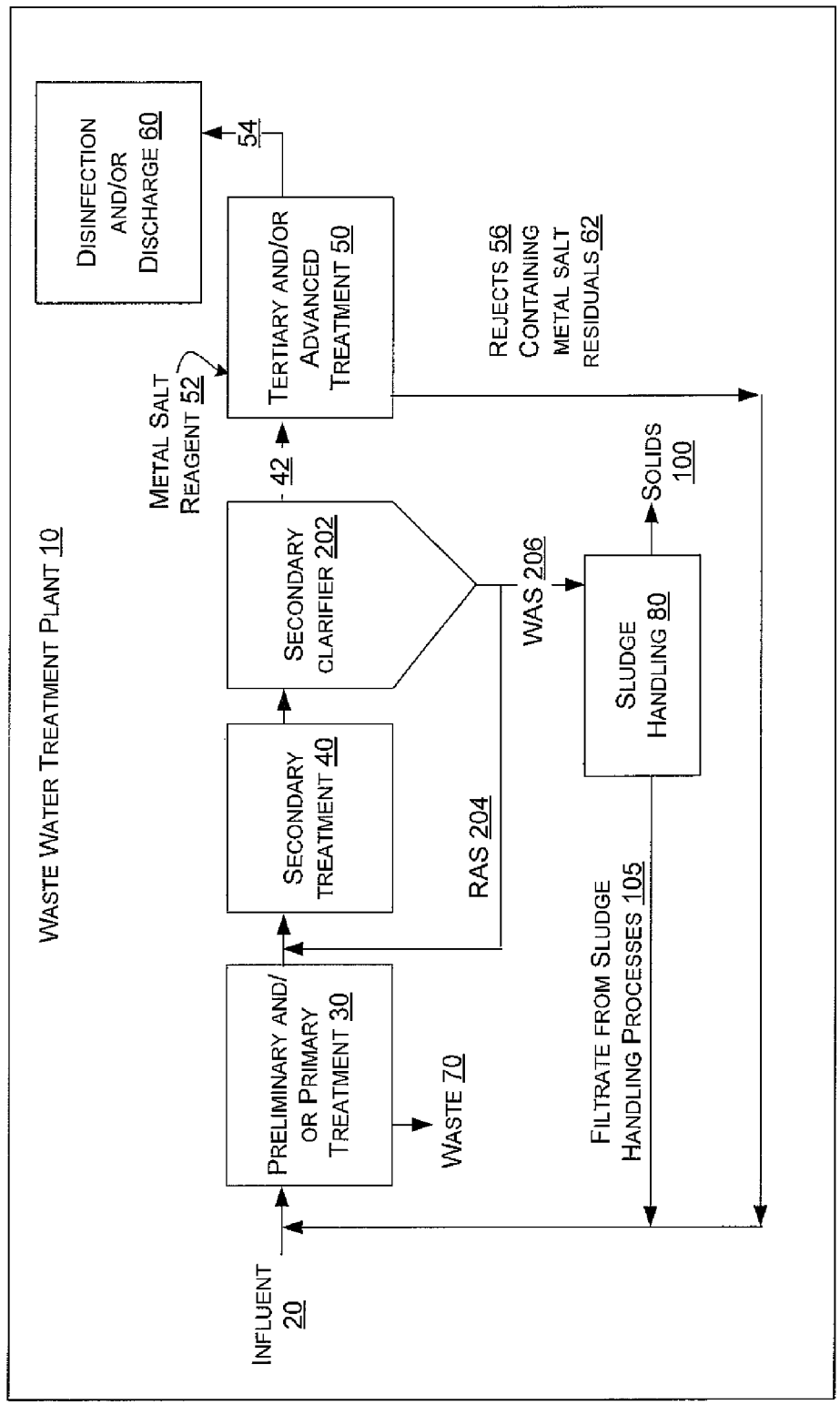
Figure 3:
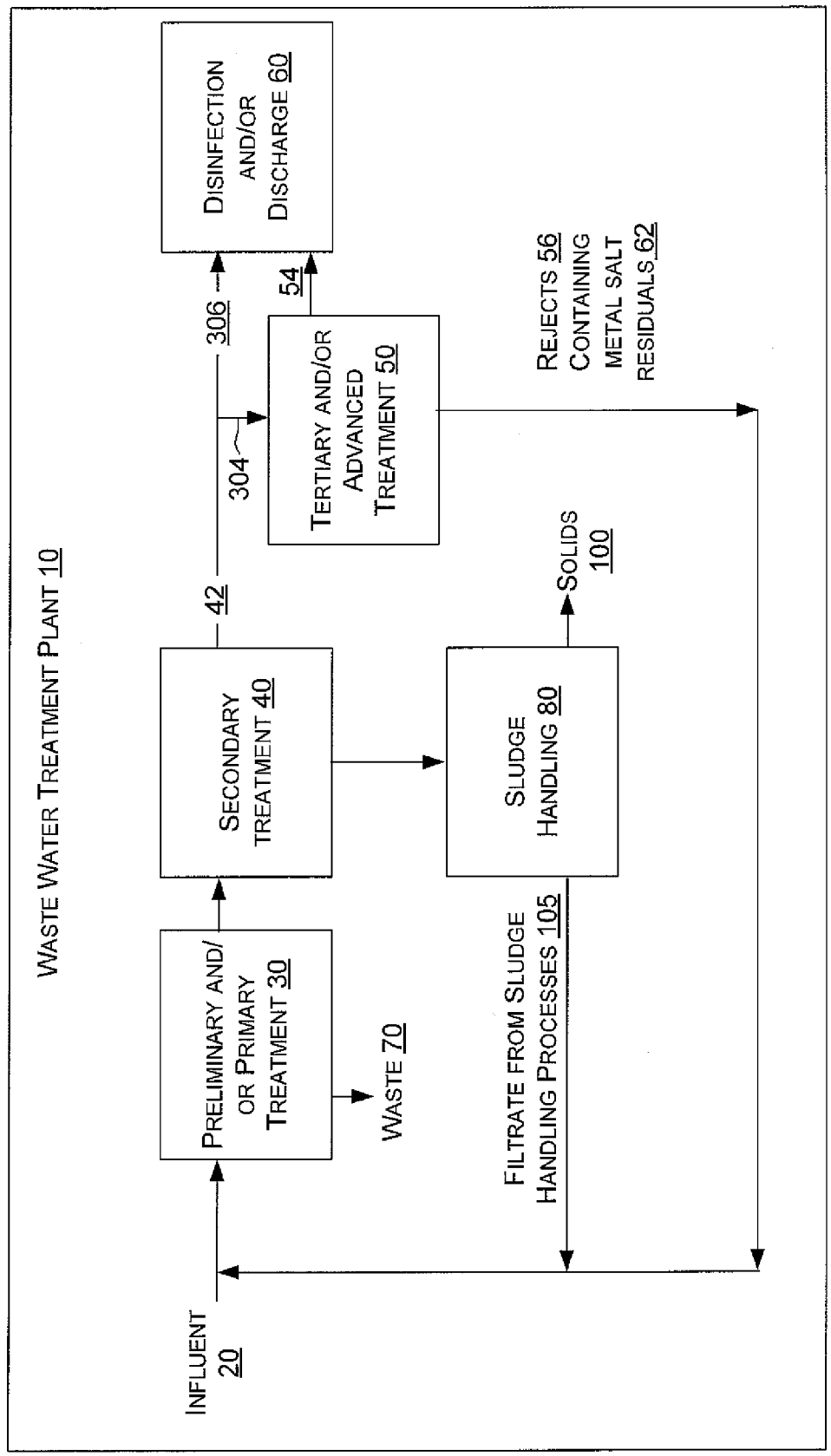

FIGS. 1-3 relate to exemplary plants or systems for treating a water stream by employing a tertiary treatment process, such as active filtration. A waste stream of rejects from the tertiary treatment process is recycled back into the water stream effective to enhance contaminant removal.

FIG. 1 shows a wastewater treatment plant 10 where influent water 20 is treated with preliminary and/or primary treatment processes 30. The water then passes to a secondary treatment process 40 which produces effluent water 42. In the wastewater industry, "secondary treatment" typically refers to the biological portion of a wastewater-treatment process whether or not there is primary treatment; a "secondary clarifier" may therefore be the first clarifier in the process train. The effluent water 42 subsequently reaches tertiary and/or advanced treatment 50 for further processing. In some of the described configurations, and as will be described in more detail below in relation to FIGS. 8-9, a metal salt(s) reagent 52, such as ferric chloride, is added during tertiary or advanced treatment 50.

Tertiary and/or advanced treatment 50 serves to separate effluent water 54 from a rejected waste or rejects 56. The effluent water 54 passes on to disinfection and/or discharge 60. In some implementations, rejects 56 are recycled to an earlier point in the plant's treatment. In this instance the rejects 56 are recycled to the front of the treatment plant, i.e. combined with the influent water 20. In other instances, the rejects can be recycled to an intermediate point in the plant upstream of tertiary and/or advanced treatment 50. Rejects 56 can contain contaminants as well as metal salt residuals 62. The metal salt residuals 62 and the recycling process will be described in more detail below.

Plant 10 may remove waste material 70 from the preliminary and/or primary treatment processes 30. The plant may also have sludge-handling facilities 80 for treatment of sludge from the secondary treatment processes 40. The sludge-handling facilities 80 may also treat sludge from the preliminary and/or primary treatments 30 and from the tertiary and/or advanced treatments 50. Solids 100 from the sludge-handling facilities 80 may be separated from a filtrate 105. The filtrate 105 may be directed back to the front of the plant 10. The filtrate 105 may or may not be combined with rejects 56 containing metal salt residuals 62 before being recycled to the front of the plant 10.

In some embodiments, the preliminary and/or primary treatment processes 30 include any headworks or single or combined preliminary or primary treatment processes such as screening, bar racks, comminutors, grit removal, sedimentation tanks, flotation, and primary clarification, or no preliminary or primary treatment. "Preliminary and/or primary treatment" as used herein includes any of those same single or combined processes.

In other embodiments, the secondary treatment process 40 may be manifest as any form of secondary treatment including aerobic or anaerobic suspended-growth variations, aerobic or anaerobic attached-growth variations, biological nutrient-removal variations, lagoon systems, septic systems, physical-chemical systems, chemical oxidation, advanced oxidation, membrane filtration, or membrane bioreactors. In some applications, such as treatment of industrial waste streams, there may be no secondary or biological treatment. "Secondary treatment" as used herein includes any of those same single or combined processes. For the sake of brevity only a single configuration for the primary treatment process 30 and the secondary treatment process 40 is illustrated. However, the skilled artisan should recognize from the discussion presented herein that any combination of preliminary, primary, and/or secondary treatment processes can be utilized in various embodiments.

Rejects 56 from the tertiary and/or advanced treatment process 50 contain metal salt residuals 62 that can be in the form of pre-hydrolyzed metal salts. As used herein "pre-hydrolyzed metal salts" means any metal salt residual or reject material which has been generated by a tertiary and/or advanced water-treatment method or created by mixing metal salt reagent 52 or other metal source with a water source other than the influent water. Recycling some or all of rejects 56 containing the metal salt residuals 62 to an earlier point in plant 10, such as into influent water 20 can lead to a subsequent rise in the plant's contaminant removal efficiency. For instance, the concentration of contaminant in effluent water 54 (and/or effluent water 42) can decrease after the metal salt residual recycling process commences. In some instances, a lag time between the metal salt residual recycling and the minimum contaminant concentrations in effluent 54 may be experienced. The lag time appears to be related to solids retention. In some instances the lag time can be quite short (i.e., less than a day) while in other instances a lag time of several days to several weeks can be expected after the recycling of the metal salt residuals 62 begins before minimum contaminant concentrations are realized in effluent water 54. To summarize, once the lag time (if any) expires the average contaminant concentrations tend to be lower than before the recycling process.

In other embodiments, such as the illustrated embodiment of FIG. 2, the secondary treatment process includes an activated-sludge process. The activated sludge process includes secondary treatment 40 and a secondary clarifier 202. Return activated sludge (RAS) 204 from the secondary clarifier 202 is recycled to the front of the secondary treatment process 40. A waste activated sludge (WAS) 206 portion of the sludge is sent to the sludge handling system 80. The rejects 56 containing metal salt residuals 62 may be recycled to a point before or after the preliminary and/or primary treatment processes 30 and before or after the point at which the RAS 204 is recycled to the process water. The rejects 56 containing metal salt residuals 62 may also be combined with either RAS 204, any other water, such as filtrate 105 from sludge handling processes 80, or a combination of other streams before being returned to the main process stream.

In some embodiments, the tertiary and/or advanced treatment 50 is manifest as reactive filtration, examples of which are described in more detail below in relation to FIGS. 8-9. The tertiary and/or advanced treatment 50 may be manifested as any single or combined tertiary and/or advanced treatment technology, including reactive filtration, other sand filtration-based technologies, filtration technologies that use media other than sand, upflow clarification, high-rate clarification, membrane filtration, ultrafiltration, ion exchange, adsorption, or advanced oxidation processes, such as ozone treatment. In other embodiments, the tertiary and/or advanced treatment 50 may be embodied as the processes disclosed in U.S. Pat. No. 5,843,308 or U.S. Pat. No. 6,426,005. "Tertiary and/or advanced treatment" as used herein includes any of those same single or combined processes.

Metal salt reagents 52, such as pre-hydrolyzed metal salt reagents, may be created from various metals, metal salts, metal compounds, or combinations thereof, including iron, aluminum, manganese, zinc, copper, magnesium, and calcium, among others. Starting materials for this reagent may be suitable pure materials commercially obtained as typical water-treatment reagents, waste or byproduct materials from another process, or natural materials obtained from mined or extracted minerals with or without intermediate processing. The resulting solution or residuals may or may not require pH adjustment. The reagent solution may be applied in a continuous flow, semi-continuous flow, batch flow, or other addition method that may be advantageous. Mechanical mixing may be applied to the pre-hydrolyzed reagent solution to maintain solution consistency. The metal ions may be produced alternately by an electrolytic process with the application of electric current into metal electrodes or by the chemical reaction of a metal-containing material or waste product with a reactive reagent such as an acid or enzyme. The metal solution may be created from the spontaneous reaction of a metal such as zero-valent iron with water. Iron, as salts or compounds, will typically be used as the metal reagent due to its proven reactivity with a variety of contaminants and its current widespread use in water treatment The favorable interaction of oxidized iron with iron-reducing bacteria (IRB) is another potential advantage. Several contaminants of interest have significant direct iron-compound reactivity. Ferric chloride, for example, is a commonly utilized reagent when phosphorus or arsenic is the target contaminant. It is recognized that certain contaminants such as arsenic will be less desirable for recycling back into a water-treatment process because of the potential toxicity resulting from a process upset that relates to the release of concentrated hazardous waste. In other cases, rejects 56 containing metal salt residuals 62 may be created during tertiary and/or advanced treatment 50 and recycled to a point earlier in the wastewater treatment plant.

In some embodiments, such as the illustrated embodiment of FIG. 3, metal salt reagents may also be created in a separate advanced and/or tertiary treatment process 50 that functions to produce recyclable metal salt residuals and/or to remove contaminants from water 42. Advanced and/or tertiary treatment process 50 can produce pre-hydrolyzed metal salt reagents, such as by mixing the metal salt reagents with water (not specifically designated) other than the influent water, such as filtrate recycled from later in the water-treatment plant or a different water source. This reagent stream may benefit from pH adjustment, exposure to atmospheric oxygen, aging in a holding tank, and/or other chemical or physical treatments.

The availability of the metal for generating metal salt residuals or the stability of the residuals or their solution may be improved by chemically reacting the metal or solution, including precipitation, co-precipitation, changing the oxidation-reduction potential or the pH of the solution, adding a coagulant or coagulant aid, or using a combination of metal reagents or metal-containing media. The metal-reagent solution may be dilute or concentrated, and other metal-containing or non-metal-containing solids may be added to enhance the desired reaction.

In some embodiments, the metal salt reagent 52, such as ferric chloride, is added to tertiary and/or advanced treatment 50 to treat the water during the process and to generate metal salt residuals 62. In other embodiments, another source of metal is added to the process or held within the process. In one such instance, the tertiary and/or advanced treatment's media contains metal in one or more of the following forms: zero-valent metals, goethite, magnetite, iron oxides, amorphous iron oxides, granular ferric hydroxide, granular ferric oxide, iron oxide-coated materials such as sand, or electrically-generated iron or other metal solutions. In other embodiments, the iron or other metal content of the influent water 20 is used to generate metal salt residuals 62.

In some cases, less than all of the effluent water resulting from the preliminary and/or secondary treatments 30, 40 respectively may be treated utilizing tertiary and/or advanced treatment. One such embodiment is illustrated in FIG. 3 where wastewater treatment plant 10 may send only a portion 304 of the effluent from secondary treatment 40 to tertiary and/or advance treatment 50. This configuration is particularly useful in situations for which the whole secondary effluent flow (42) does not need to be treated to achieve the desired total plant effluent contaminant concentrations. In this case, the other portion 306 of the effluent from secondary treatment 40 bypasses tertiary and/or advanced treatment 50 and goes directly to disinfection and/or discharge 60. Effluent 54 from the tertiary and/or advanced treatment 50 may pass directly to disinfection and/or discharge 60 or be combined with effluent from secondary treatment 40 or with filtrate 105 from sludge-handling processes 80.

In other embodiments, the whole of the reject stream 56 may not need to be recycled to an earlier point in the treatment plant in order to achieve the effluent contaminant concentrations required. In such an instance, only a portion of the metal salt residuals 62 may need to be recycled, the other portion may be sent to sludge handling facilities 80.

In some embodiments, recycling of metal salt residuals can be employed with various other techniques. For instance, in some such embodiments, coagulants or coagulant aids, such as polymers, may be added in any of the processes in the treatment plant. In other embodiments, lowering of nitrogen concentrations may be accomplished in the water-treatment plant concurrent with the process of the present application. For example, denitrification may be accomplished in the tertiary and/or advanced treatment concurrent with the production of metal salt residuals for recycle.

In other embodiments, disinfection processes may be applied before, during, or after the tertiary and/or advanced treatment processes. These disinfection processes may include chlorination, ultraviolet (UV) treatment, ozone treatment, or other disinfection or advanced-oxidation processes. There also may be no disinfection process. Additional oxidative capacity of the residual waste stream that is recycled from a tertiary and/or advanced treatment process 50 back to the initial stages of wastewater treatment may assist in the chemical and microbial processes used in wastewater treatment.

In other embodiments, the sludge-handling system 80 may comprise any combination of sludge digestion, conditioning, and/or dewatering processes, such as aerobic digestion or anaerobic digestion, filter press, belt filter press, centrifugation, drying beds, lagoons, blending, bulking, composting, grinding, incineration, screening, stabilization, thickening, flotation, gravity, rotary drum, chemical addition, freeze-thaw, heat treatment, preheating, or disinfection. The sludge-handling system may also be combined in some way with secondary treatment process, such as in sequenced batch reactors, septic systems, and lagoons.

Figure 4:
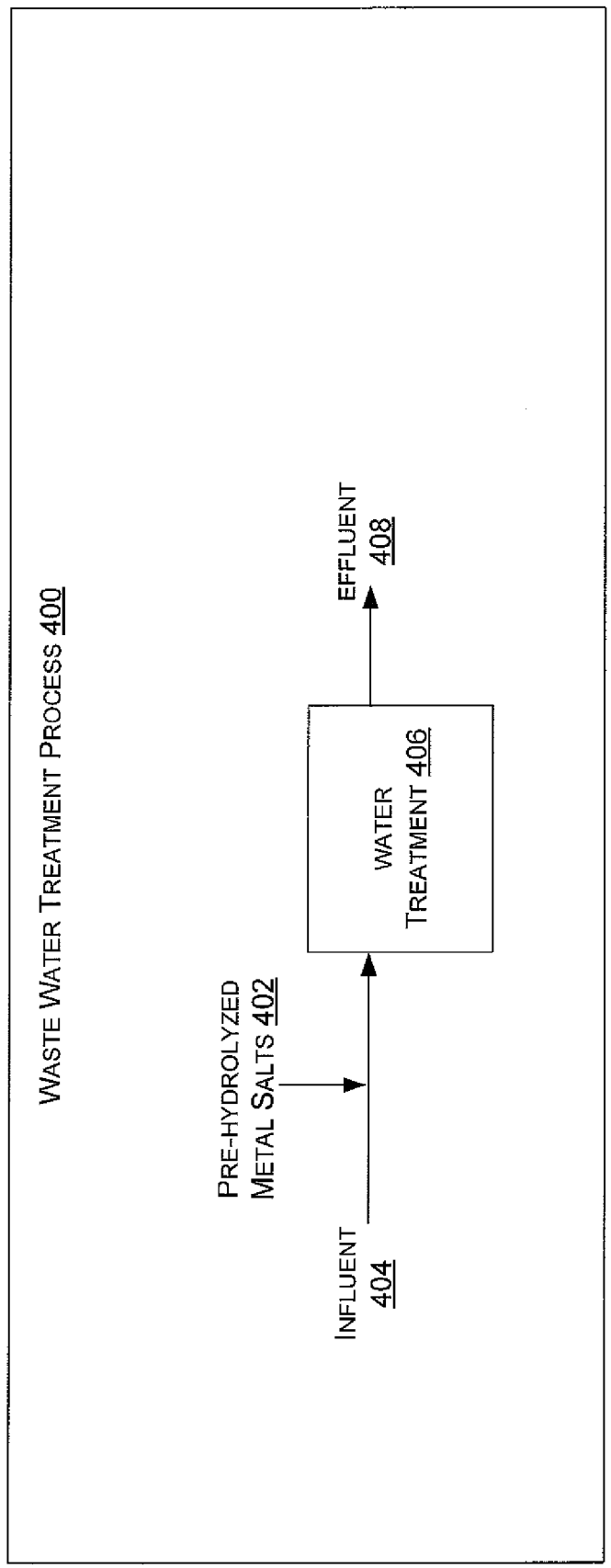

In some embodiments of the present application, such as the illustrated water treatment process 400 of FIG. 4, pre-hydrolyzed metal salts 402 are added to influent water 404. The pre-hydrolyzed metal salt treated water is allowed to enter a water-treatment process 406. The water-treatment process 406 may be manifest as a single process or any combination of preliminary, primary, secondary, tertiary, or advanced water or wastewater-treatment processes. The water-treatment process 406 may comprise either a centralized wastewater-treatment system, such as a municipal wastewater-treatment system, or a decentralized wastewater-treatment system, such as industrial-wastewater treatment, package-plant wastewater treatment, and/or septic system(s). An effluent stream 408 is produced with a lower concentration of the target contaminant, such as phosphorus than influent water 404.

Figure 5:
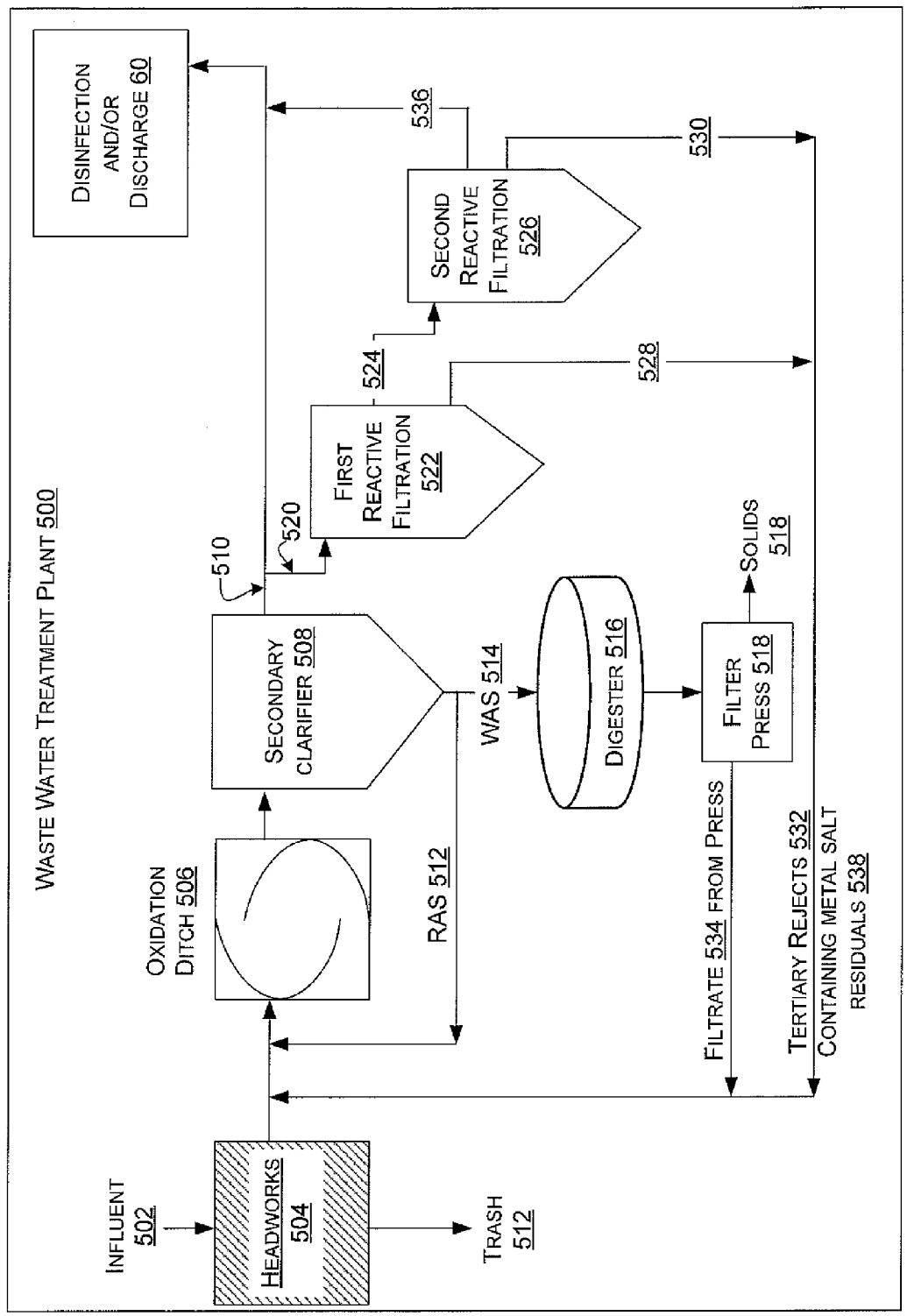
Figure 6:
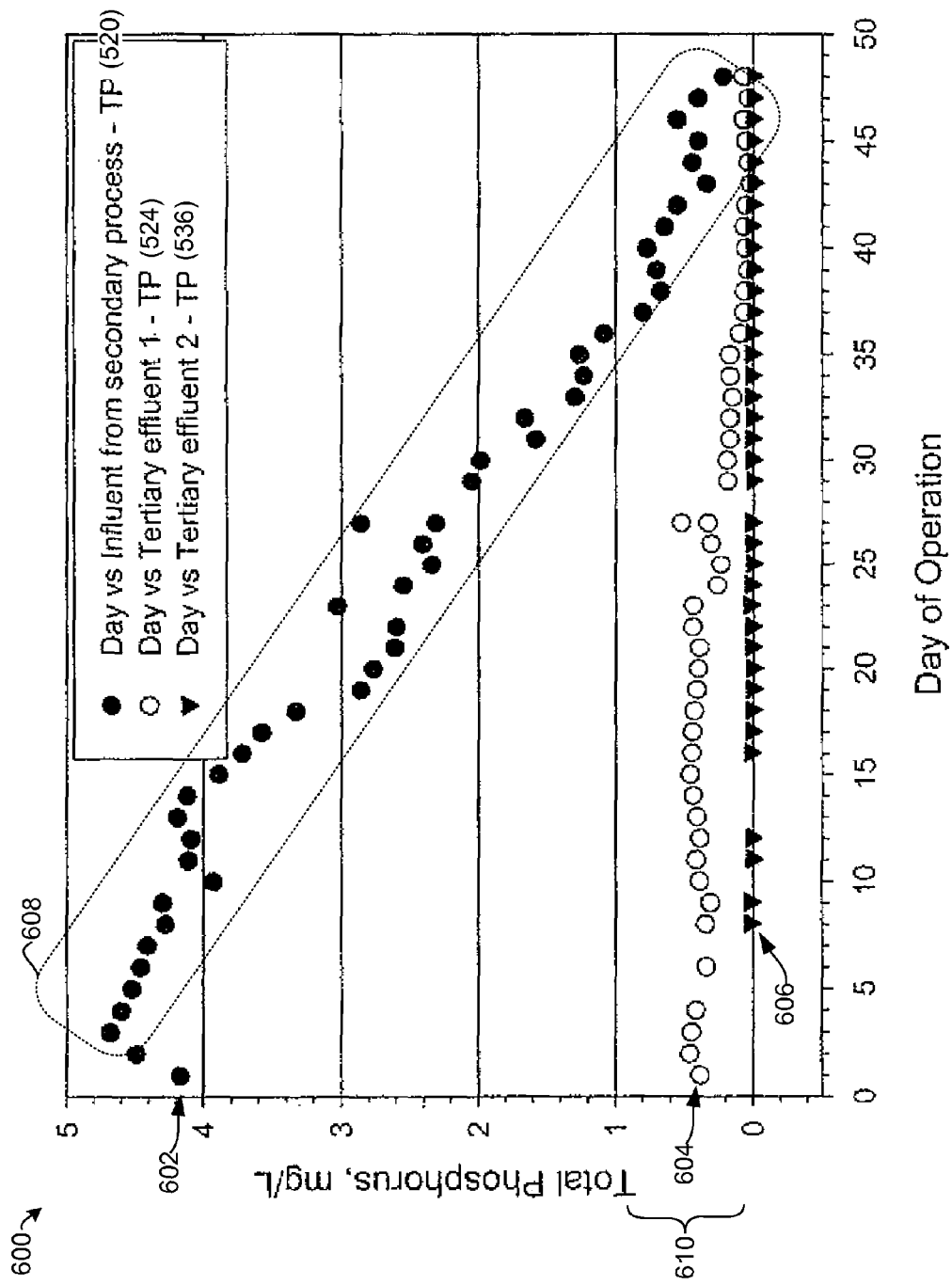
FIG. 6 illustrates results obtained from one embodiment of the present application.
Figure 7:
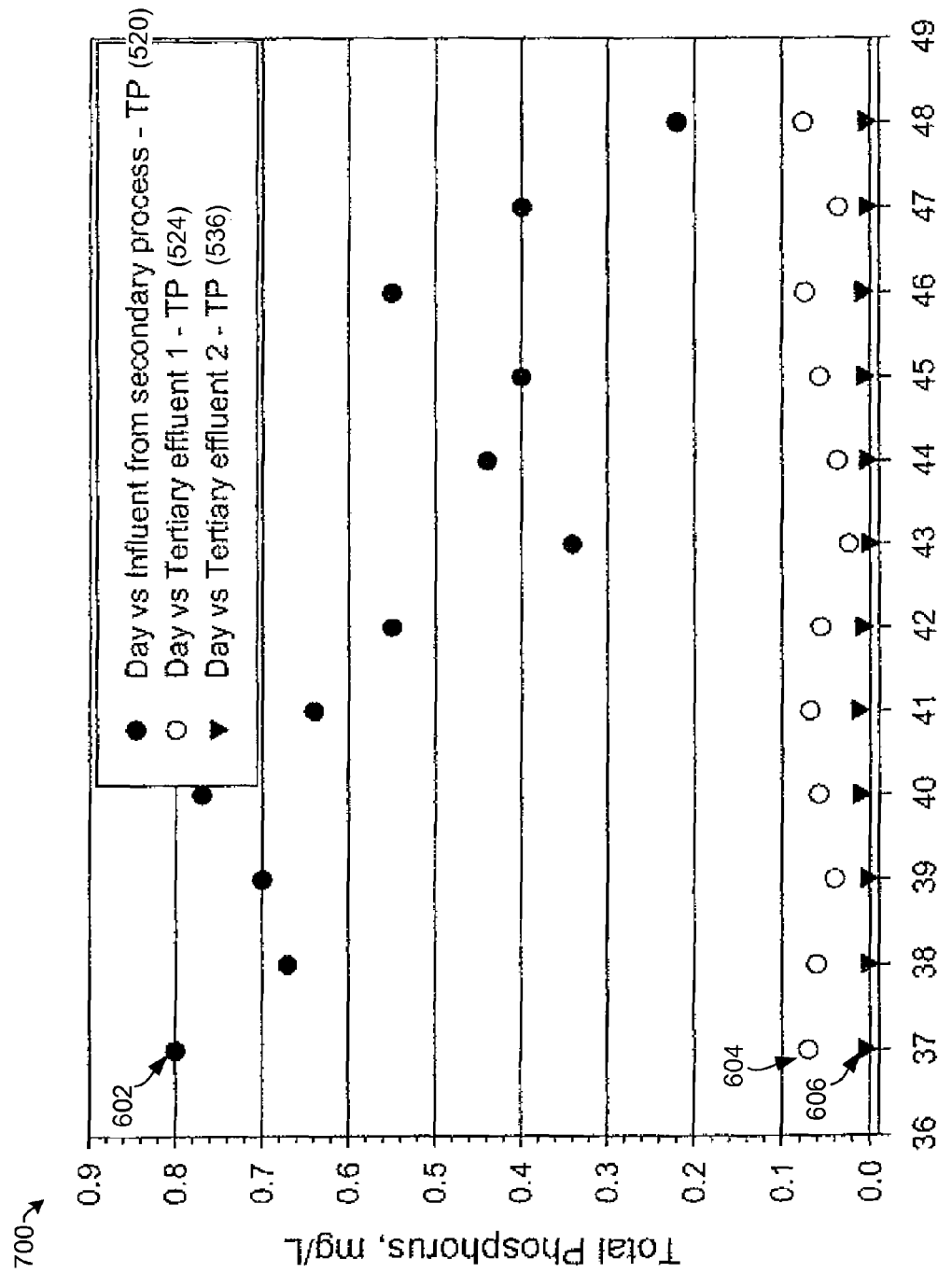
FIG. 7 illustrates an alternate view of the results shown in FIG. 6.

In one exemplary embodiment, a wastewater treatment plant 500 was configured as shown in FIG. 5 and operated to obtain the removal of phosphorus. Illustrated test results from wastewater treatment plant 500 are described in relation to FIGS. 6-7. The process conditions for this operation are described below. FIGS. 5-7 are discussed collectively below.

Referring to FIG. 5, the flow rate of influent wastewater 502 to the wastewater treatment plant 500 averaged about 1 million gallons per day (MGD). During this experiment, the total phosphorus concentration in the influent wastewater 502 fluctuated between approximately 4.6 and 5.5 mg/L P. As used herein, "mg/L p" means milligrams total phosphorus per liter of total solution or slurry (a similar concentration definition applies for other contaminants or reagents). The influent wastewater 502 was drawn into the plant headworks 504, which consists essentially of screening. After the headworks 504, the wastewater was split between two oxidation ditches 506. The total capacity of the oxidation ditches 506 was about 1 million gallons, resulting in a hydraulic detention time of about 1 day. Water from the oxidation ditches 506 passed to two secondary clarifiers 508. Effluent flow 510 leaving the secondary clarifiers 508 was also about 1 MGD. Sludge from the bottom of the secondary clarifier 508 was taken as return activated sludge (RAS) 512, and waste activated sludge (WAS) 514. RAS 512 was recycled to a point ahead of the oxidation ditches 506. WAS 514 was sent to an aerobic digester 516, then on to a belt filter press 518 for dewatering.

A first portion 520 of effluent water 510 from the secondary clarifiers 508 was directed to a first tertiary reactive filtration process 522. In this instance first portion 520 was about 0.25 MGD or about 175 gallons per minute (gpm). As will be described in more detail below, total phosphorus concentrations in the first portion 520 of water entering tertiary treatment 522 are plotted in FIG. 6. Effluent 524 from the first tertiary treatment 522 was directed to a second tertiary reactive filtration process 526. A reject flow 528 from first reactive filtration treatment 522 and a reject flow 530 from second reactive filtration treatment 526 were combined to form rejects 532 that was added to filtrate 534 from the filter press 518. The combined reject flows and filtrate from the filter press were then recycled to a point after the plant headworks 504 and before the oxidation ditch 506. The combined rejects 532, 534 were added at essentially the same place as the RAS 512 stream was added.

The first tertiary treatment 522 and second tertiary treatment 526 used upflow, continuous-backwash, moving-bed sand filters with a filtration area of 50 ft² and a bed depth of 60 inches. The media in both filters was sand comprising silica, the sand particles having an effective diameter of 0.9 mm and a uniformity coefficient of 1.5. The first tertiary treatment 522 process conditions included an influent flow rate of about 0.25 MGD or about 175 gpm, a compressed air flow of about 180 standard cubic feet per hour (scfh), and a chemical dose rate of about 15 mg/L Fe. The chemical reagent used comprised ferric chloride. The flow rate of rejects 528 from the first tertiary treatment 522 process was about 15 gpm. The resultant tertiary effluent 524 from the first tertiary treatment 522 was therefore about 160 gpm. The second tertiary treatment 526 process conditions included an influent flow rate of about 160 gpm, a compressed air flow rate of about 140 scfh, and a chemical dose rate of about 10 mg/L Fe. The chemical reagent used comprised ferric chloride. The reject 530 flow rate from the second tertiary treatment 526 process was about 15 gpm. The resultant tertiary effluent 536 from the second tertiary treatment 526 was therefore about 145 gpm. The combined reject flow 532 from both tertiary treatment processes 522, 526 was about 30 gpm.

FIG. 6 shows a plot 600 of total phosphorus levels versus days of plant operation. Total phosphorus (TP) levels in influent water 520 are illustrated for individual days as indicated generally at 602 though not all days are designated with specificity due to the physical constraints of the page upon which plot 600 appears. Similarly, total phosphorus levels in effluent water 524 are indicated generally at 604 though not all days are designated with specificity. Finally, total phosphorus levels in effluent water 536 are indicated generally at 606 though not all days are designated with specificity.

A sludge detention time in the secondary treatment (506 and 508) process was approximately 21-26 days. The time for the entire process, including addition of metal salt residuals 538 contained in rejects 532, to approach steady state may be a multiple of the sludge age, and at least about 26 days. A dramatic drop in the total phosphorus concentration in the secondary effluent 510 (i.e., influent 520) is designated generally as 608 and appears to begin leveling off at about 43 days into the experiment. The results shown in FIG. 6 therefore appear to represent transient conditions (i.e., the system may be approaching steady state in the last few days shown in the graph).

In this case, total phosphorus 602 of influent water 520 ranged from 0.22 to 4.68 mg/L P. Total phosphorus 604 of tertiary effluent 524 ranged from 0.024 to 0.52 mg/L P. Total phosphorus 606 of tertiary effluent 536 ranged from 0.002 to 0.029 mg/L P. As with the influent water 520, both of the tertiary treatment effluents (604, 606) exhibited a drop in concentrations of total phosphorus.

In order to show more detail in the low phosphorus concentration range 610 of FIG. 6, FIG. 7 shows a plot 700 with a narrowed scale on the y-axis relative to plot 600. Also in FIG. 7, the x-axis is adjusted to only show data from the last 12 days of operation of the system, Day 37 through Day 48. As shown in FIG. 7, the phosphorus concentrations 602 in influent water 520 was still dropping through Day 48, suggesting the system was not yet at steady state. Phosphorus concentrations 604, 606 of tertiary effluent water 524 and tertiary effluent water 536 respectively showed less variability in the last 12 days, as compared to the first 36 days of operation. Referring to FIG. 7, in the last 12 days of the experiment, the total phosphorus (TP) concentration 602 in the influent 520 to the first tertiary process ranged from 0.22 to 0.80 mg/L P with an average concentration of 0.50 mg/L P.

In the same period, the total phosphorus concentration 604 in the tertiary effluent 524 ranged from 0.024 to 0.076 mg/L P and averaged 0.053 mg/L P. Further, in the same period, the total phosphorus concentration 606 in the tertiary effluent 536 ranged from 0.002 to 0.014 mg/L P and averaged 0.008 mg/L P.

In this embodiment, the total iron concentration in the influent 520 to the first tertiary process ranged from 0.06 to 0.28 mg/L Fe before the point where iron was introduced during tertiary treatment. Although recycle of the tertiary effluent metal salt residuals 538 was adding approximately 5 mg/L Fe to the wastewater before it entered the headworks 504, there was no significant increase in the iron concentration in the influent 520 over the length of the experiment. It is assumed that the extra iron from the recycled tertiary metal salt residuals 538 was removed from the wastewater process stream by settling in the secondary clarifier 508. The total iron concentration in the tertiary effluent 536 ranged from 0.13 to 0.89 mg/L Fe. The total iron concentration in the tertiary effluent 536 was lower later in the experiment; during the last 10 days of the experiment the iron concentration ranged from 0.13 to 0.36 mg/L Fe with an average of 0.22 mg/L Fe.

Additional data show that total suspended solids (TSS) were lowered in the effluent 510 of the secondary clarifier 508 from at least about 5-6 mg/L to about 2-3 mg/L. Biological oxygen demand (BOD) was lowered in the effluent of the secondary clarifier 508 from at least about 8 mg/L to about 6 mg/L.

The experimental results show that very low total phosphorus concentrations were achieved in effluent from the secondary clarifiers 508. The levels were lower than is typically predicted for chemical addition to a wastewater-treatment plant, particularly at the relatively low iron dose that the recycled rejects 532 provided. The phosphorus levels were also lower than is typically predicted for biological phosphorus removal, particularly without the anoxic basins usually considered necessary for selection of phosphate-accumulating organisms. TSS and BOD concentrations were also lowered by this process. In this experiment, the sludge-handling system was not adjusted to accommodate the addition of the process of the present application; existing sludge-handling equipment (515 and 516) was able to handle the new process configuration and sludge handling was actually improved.

Exemplary Reactive Filtration

Figure 8:
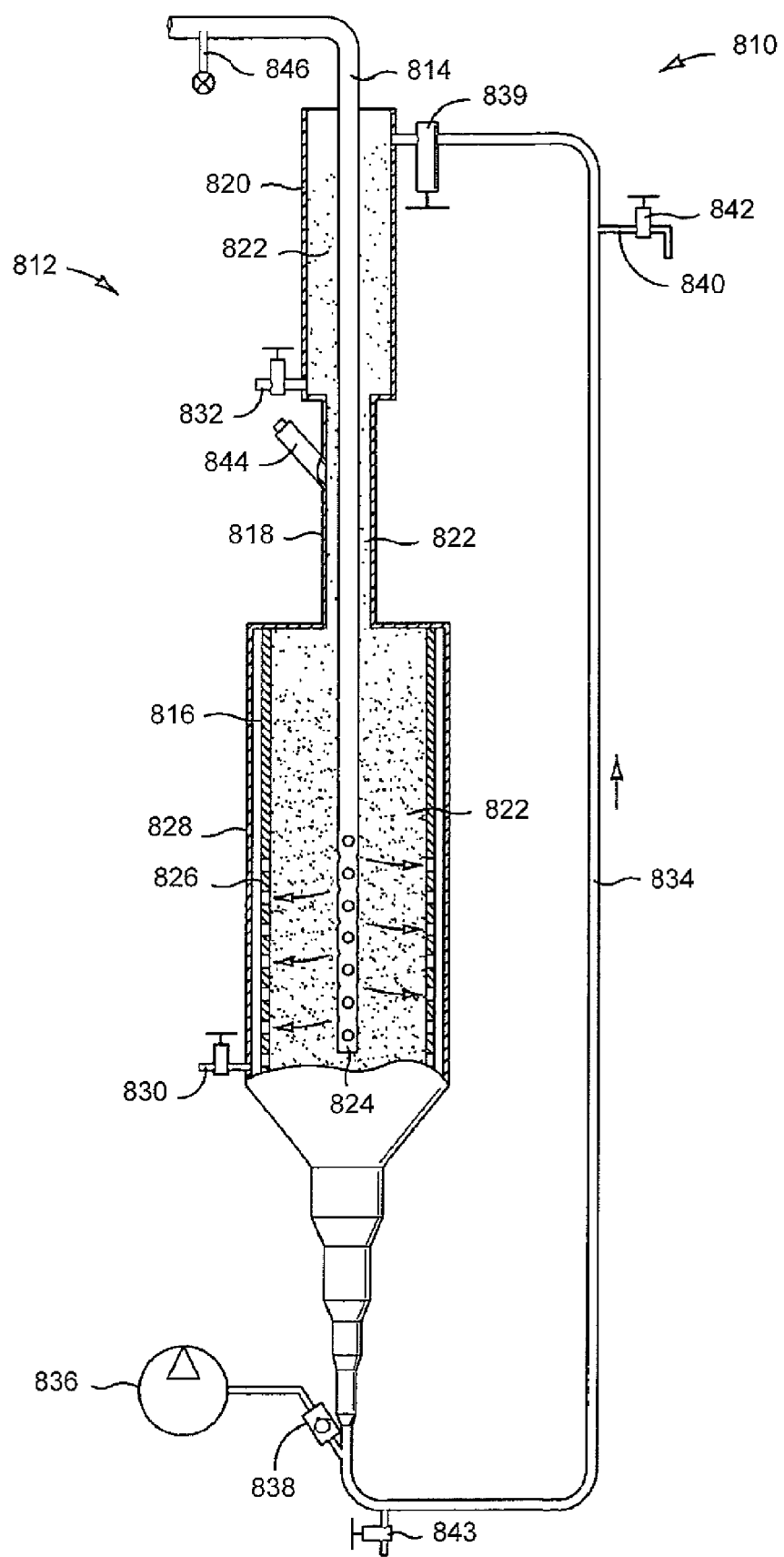
FIGS. 8-9 illustrate specific components of the wastewater treatment systems introduced in relation to FIGS. 1-5 in accordance with one embodiment.
Figure 9:
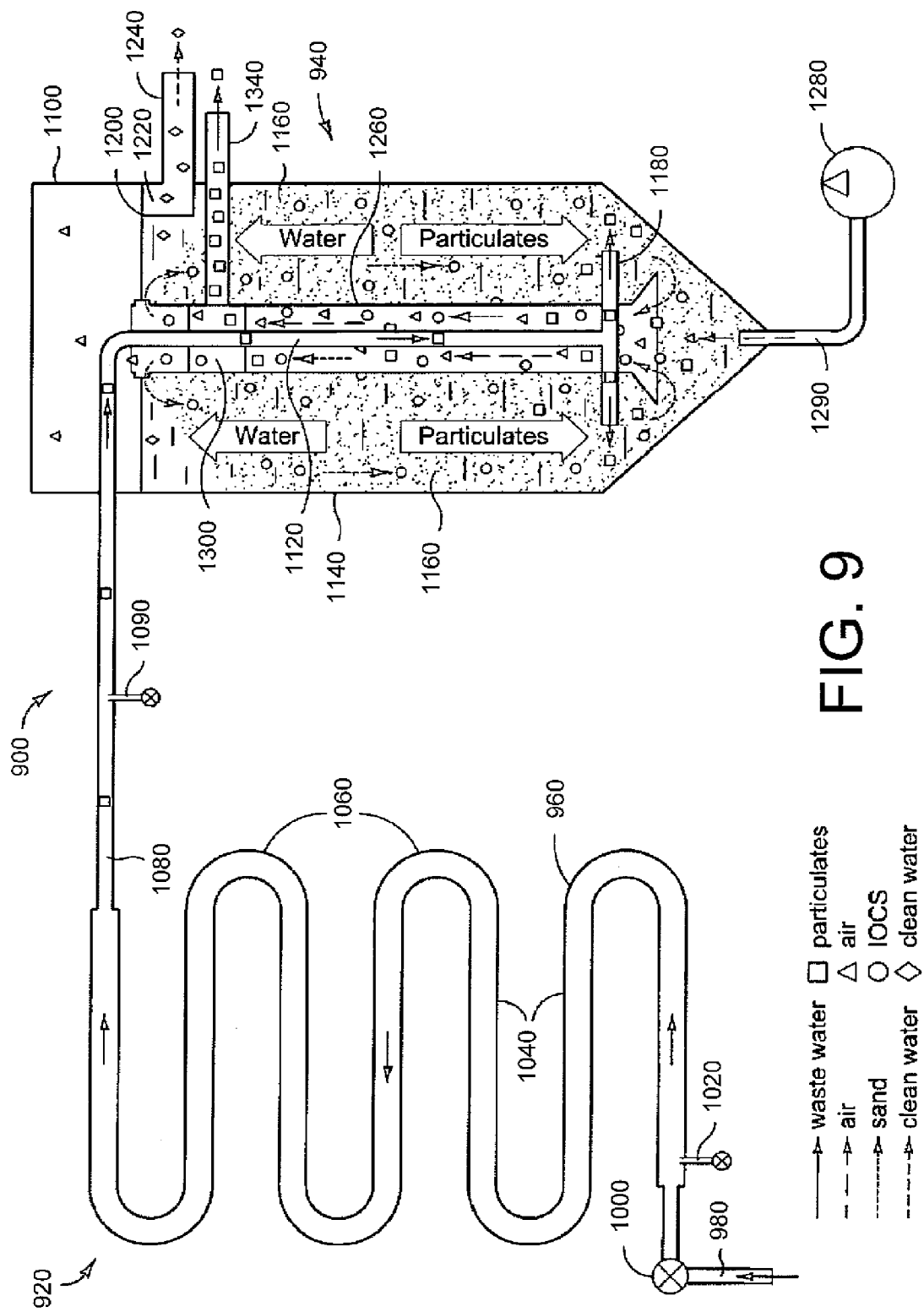

FIGS. 8-9 illustrate examples of reactive filtration treatment systems that can be employed in exemplary tertiary and/or advanced treatment processes such as those described in relation to FIGS. 1-3 and 5.

FIG. 8 illustrates a moving-bed particle radial reactive filtration system 810 that may be used to implement embodiments of the inventive concepts, such as the reactive filtration concepts described above. Referring to FIG. 8, wastewater flows into a vertically oriented cylindrical treatment vessel 812 through an inlet pipe 814. Vessel 812 includes a filter chamber 816, a stem 818 and an expansion gravity settling chamber 820. Filter chamber 816 contains a bed of sand 822, iron oxide coated sand, sand coated with various iron containing compounds such as sand and iron granules or another suitable filter media. Inlet pipe 814 extends down into filter chamber 816. Wastewater is discharged into sand 822 along the perforated lower part 824 of inlet pipe 814. Treated water flows out of filter chamber 816 through a perforated outer perimeter 826 into a sleeve 828 and is removed from vessel 812 through an outlet pipe 830. The perforations in the lower part 824 of inlet pipe 814 and the outer perimeter 826 of filter chamber 816 are screened as necessary to prevent sand from passing through the perforations.

The comparatively narrow stem 818 of vessel 812 connects filter chamber 816 with expansion chamber 820. A sludge removal port 832 is positioned near the bottom of expansion chamber 820. A recirculation pipe 834 extends from the bottom of filter chamber 816 to the top of expansion chamber 820. An air compressor 836 pumps air into recirculation pipe 834 at the bottom of filter chamber 816 causing a counter-clockwise motion of air, water, sand and filtered particulates through vessel 812. A back flow preventer 838, such as a flapper valve, prevents materials in recirculation pipe 834 from flowing back into compressor 836. A flow control valve 839, sampling tube 840, sampling valve 842 and clean-out 843 on recirculation pipe 834, and a sight glass 844 in stem 818, may be provided if necessary or desirable.

In operation, wastewater pumped into filter chamber 816 through inlet pipe 814 passes radially through sand 822 into sleeve 828 and flows out outlet pipe 830 as treated water. Sand 822 moves generally continuously down through vessel 812 under the influence of gravity. An aerated mixture of used sand and water flows from the bottom of filter chamber 816 back up to expansion chamber 820 through recirculation pipe 834 along with contaminants removed from the wastewater Air is vented to the atmosphere at the top of expansion chamber 820 to prevent pressurization of the system. The pressure head of water in sand 822 is kept such that some of the treated water flows from filter chamber 816 up through stem 818 into expansion chamber 820 to rinse contaminants from the used sand particles returning to expansion chamber 820. This rinse water, now carrying a high concentration of contaminants that tend to be less dense than sand, is removed from chamber 822 and flows out through sludge removal port 832. In one operation, the top of the sand bed for filtration is three fourths the height of filter chamber 816. Expansion chamber 820 and narrow stem 818 contain a dilute sand and water mixture that contains filtered particles that have been moved first to the bottom of sand 822 and circulated via pipe 834 into the water residing in expansion chamber 820. In one case, water flow at inlet pipe 814, outlets 830 and 832 and recirculation pipe 834 can be balanced so that a rate of 5-10% of the inlet water carrying contaminants is discharged through sludge removal port 832.

In some embodiments, the system of FIG. 8 may be used to implement a process for continuously regenerating an iron oxide coated sand bed, and/or other iron containing compounds coated sand bed, while simultaneously filtering contaminants from the incoming flow of wastewater. The process creates and utilizes a reactive filter media that removes contaminants, such as by filtering and/or by adsorption. A reactive filter media is any filter media with the additional capability of removing contaminants from wastewater through chemical processes such as adsorption. For instance, the iron oxide coated sand bed, a reactive filter media, screens contaminants from the water and the reactive surfaces of the granules of sand adsorb contaminants from the water. In one embodiment, iron metal granules in proportions of 10-30% by volume in sand bed 822 provide a solid phase reactive surface of corroding iron metal as well as a source of dissolved iron such as salts of $Fe(II)$ and $Fe(III)$ that react with the sand in the filter bed to create reactive iron oxide coated sand and/or other iron containing compounds that interact with the contaminants. The strongly reducing nature of water solutions with iron metal and sand mixtures can be useful for chemical reactions, such as the reductive degradation of organic solvents dissolved in contaminated water. Reduction potentials lower than $-200$ mV versus the standard hydrogen electrode can be observed with 30% iron:sand mixtures.

In some embodiments, a reagent capable of creating a reactive surface on the filter media is added to the incoming flow of wastewater at molar ratios such as 5:1 to 200:1 with the target contaminant. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is an exemplary reagent when phosphorus or arsenic is the target contaminant. In any particular water targeted for treatment, there may be alternate and competitive reactive pathways for the added active reagents. These pathways will be the result of the specific water chemistry in the wastewater. For example, wastewater with high levels of dissolved carbonate or phosphate can react with added iron salts in competition to the target contaminant such as arsenic. Molar ratios of $Fe(III)$ to water arsenic in field studies have been in excess of 100:1. In these studies, inlet concentrations of arsenic in source water for drinking were reduced from approximately 40 parts per billion to less than 5 parts per billion treating at a rate of 10 gallon per minute in a pilot scale operation. However, other water types may have less alternate, competitive reactive pathways. Some implementations may field test to determine the optimal molar ratio for any particular treatment environment to ensure sufficient excess reagent is delivered to the reactive sand surface to form iron oxide coated sand. Still other implementations may dose the metal salt reagent based upon an amount sufficient to coat the sand with metal salt reagents and/or derivative thereof, or may dose to match a total suspended solids to total dissolved solids ratio (TSS/TDS). Calculating near optimal reagent dosing rates can further decrease reagent costs and process costs resulting from having large amounts of excess reagent in the resulting effluent.

In the removal of dissolved and suspended phosphorus, field studies have demonstrated that successful high flow, low concentration removal occurs in this process in iron to phosphorus molar ratios of 5:1 to 40:1. It can be advantageous that the actual reagent dose is optimized to ensure near complete solution reaction and saturation of all of the competing reactive pathways and allowing for residual iron in the solution to react with the sand bed. In some phosphorus contaminated test wastewaters, optimizing the correct balance of conditions yields a ratio of iron to phosphorus at 8:1. The metal salt reagent, ferric chloride in this example, reacts with the surface of the sand to form iron oxide coated sand (IOCS) and/or hydrous ferric coated sand, among other compounds. IOCS provides a stationary phase removal pathway for water borne contaminants such as phosphorus and arsenic. Contaminants in the wastewater are exposed as a "mobile" phase over the "stationary" (slowly moving) IOCS bed for high efficiency sorptive and ion exchange removal. The physical action of the moving sand abrades the surface of the sand granules, regenerating active sites for additional iron salt and water contaminant reactions. Hence, regenerated reactive sites for contaminant binding are continually presented to the flowing water. Abraded sand-iron-contaminant solids are removed by the screen filtering action of the sand bed. The treated water exits the sand filter bed with contaminants substantially removed, ready for discharge, recycling, or post-treatment processing.

Sorption is the removal of undersaturated solutes from solution onto minerals. Sorbate is the species removed from solution and the sorbent is the solid onto which solution species are sorbed. There are three types of sorption: adsorption wherein solutes are held at the mineral surface as a hydrated species; absorption wherein solute is incorporated into the mineral structure at the surface; and ion exchange wherein an ion becomes sorbed to a surface by changing places with a similarly charged ion previously residing on the sorbent. Mineral surfaces, such as the silicates in sand, have fixed or acquired surface charges that can be modified by water chemistry such as pH and dissolved solutes such as iron salts that can complex with the surface charges of sand. As a result of fixed surface charges, a property of the mineral, and pH, a property of the water, mineral surfaces develop a point of zero net proton charge (PZNPC). The PZNPC is the pH at which net surface charge is zero. At lower pH than PZNPC, the net surface charge is positive and at higher pH, the net surface charge is negative. These surface charges allow attraction of oppositely charged anions or cations, respectively, from solution. Larger amounts of dissolved constituents, such as positively charged Fe(III) can be attracted to a negatively charged surface such as the silicates in sand to such a degree that the surface becomes overall positively charged and therefore attractive to anions such as phosphate and arsenate. Silica, $SiO_2$ has a low PZNPC of 2, whereas iron oxyhydroxide, .alpha.-FeOOH has a PZNPC of 7.8, and iron hydroxide, $Fe(OH)_3$ has a PZNPC of 8.5. Increasing quantities of iron oxide forming on a sand surface can increase the PZNCP of the sand grains such that net surface charge is positive and thereby attractive to anions such as phosphate and arsenate at higher pH levels of about 6-8. Most environmental waters, including drinking water and wastewaters exist at these circum-neutral pH levels. Hence, the selective addition of iron oxides to the sand creates a useful sorbent.

In a moving sand bed system such as the one shown in FIG. 8, concentrated contaminants, now in the form of filterable solid waste, are removed from the system through sludge removal port 832 via continuous rinsing in expansion chamber 818. This continuous rinsing and waste removal process is particularly important in the case of a hazardous material such as arsenic in drinking water. As mentioned above in relation to FIGS. 1-3, rinse/wastewater outflow (i.e., rejects 56 of FIGS. 1-3), typically 5-10% of the incoming water, can be recycled and put back into the process following separation of the suspended solids by settling or clarification. In a fixed-bed system, in which the particulate filtrate remains on the sand and in the sand, the sand bed is periodically flushed or changed out to remove the concentrated contaminant waste.

In some scenarios, the system of FIG. 8 may be used to implement embodiments of an oxidation process for treating wastewater. Ozone gas ($O_3$) can be mixed with the wastewater before the water passes through sand 822 at an ozone inlet port 846. Since ozone solubility in water is limited, mineral surfaces on the sand 822 adsorb ozone from the passing ozonized wastewater. As used in this document, "ozonized" water means any mixture or other combination of water and ozone. The adsorption of ozone on the surface of sand 822 enhances reaction with oxidizible substances in the water. Since any oxidant will have preferred chemical reactivity, such as ozone attacking double bonded carbon, it is desirable to enhance the destructive pathways available to oxidizible contaminants by introducing or creating multiple oxidation pathways. The silica in typical sand acts as a reversible ozone sorption site and activated surface. Mineral oxides in the sand or adsorbed to the sand, such as iron oxide or manganese oxide, act as catalysts to convert ozone to reactive hydroperoxides. As water passes through sand 822, the surface reaction with sorbed ozone, hydroperoxides and other oxidative byproducts enhances the reactive solution chemistry of the dissolved ozone. This allows for surface reactions for oxidation of dissolved chemical compounds, enhanced disinfection via oxidative attack on microbial cell walls and cell constituents and the conservation of total oxidant loading via solid surface storage.

Embodiments of the process can create and utilize a renewable, catalytic, oxidizing filter media that removes contaminants by filtering and by oxidation. Maximum oxidation of contaminants is combined with the particulate removal filtration properties of the moving sand 822. Ozone levels in the waste (port 832), treated water (port 830) and recirculation water (pipe 834) may be monitored to help optimize the amount of ozone introduced into the incoming wastewater. Ozone is mixed with the wastewater using any suitable gas-liquid mixing techniques, for example, contactors, diffusers or venturi effect mixers with headspace vented or vacuum pumped to prevent undesirable gas bubbles from entering the sand filter bed.

Deploying the sand or other suitable filter media in a moving bed assists in continuously renewing the ozone sorption sites as well as catalytic and activated surfaces. Movement may be accomplished, for example, by fluidizing or moving the bed using the fluid flow, by mechanical action such as augers or mixing bars, by acoustic action such as the application of ultrasonic waves or by physical transport using compressed air.

The application to the ozone containing water of ultrasonic energy for acoustic cavitation or pressure jets or diffusers for hydrodynamic cavitation may be desirable in some applications to form high energy, reactive oxidants including superoxide, hydroxyl radicals and peroxide. A reagent capable of creating a reactive surface on the filter media may be added to the incoming flow of wastewater as necessary or desirable to assist in the removal of reactive contaminants such as dissolved organic matter and phosphorus. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is a suitable reagent when phosphorus or arsenic is the target contaminant. Suspended iron-oxy-hydroxide particulates in the wastewater following the addition of ferric chloride also become catalytic surfaces for hydroperoxide formation from ozone. It is expected that the addition of ferric chloride or other fully oxidized metal salts will have minimal effect on the direct consumption of or competition for ozone.

FIG. 9 illustrates a moving bed reactive filtration system 900 that provides another example of a reactive filtration mechanism consistent with the description of FIGS. 1-3 and 5. Referring to FIG. 9, filtration system 900 includes both a pre-reactor system 920 and a reactive filter system 940. Wastewater is pumped into serpentine piping 960 of pre-reactor 920 through an inlet pipe 980 and flow control valve 1000. A metal salt reagent or other suitable reagent (examples described above and below) is introduced into serpentine piping 960 through a reagent inlet port 1020 immediately downstream from inlet pipe 980. In some instances, serpentine piping 960 is substantially larger than inlet pipe 980 to slow the flow through piping 960 compared to inlet pipe 980. A slower flow increases the time available for the reagent to mix with the wastewater and react with contaminants in the wastewater. The wastewater flow will be more turbulent near the transition from the smaller inlet pipe 980 to the larger serpentine piping 560. Introducing the reagent into this turbulent flow also helps mixing.

The wastewater/reagent mix flows through straight-aways 1040 and gentle bends 1060 of serpentine piping 960. The wastewater/reagent mix exits serpentine piping 960 into an outlet pipe 1080 that takes the mix into reactive filter system 940. Prescribed dosing for the allotted reaction time introduces the metal salt reagent in sufficient quantities and concentrations to (1) allow for the co-precipitation and flocculation reactions between the metal salt reagent and the dissolved contaminants in pre-reactor system 920 to go to near completion to dilute levels as opposed to equilibrium and diffusion limited processes which limit further reaction, (2) saturate competing reactive pathways with natural waters with reagent, and (3) leave enough excess reagent in the mix to activate the filter media in reactive filter system 940. The amount of excess metal salt reagent is determined by the reactive capacity of the influent solution and the desire to deliver excess metal salt reagent to the sand filtration bed for the continuous formation of iron oxide coated sand that can be available for direct surface sorption or mineralization reactions with contaminants.

The comparatively slow flow through serpentine piping 960 allows for better coagulation of precipitates. The straightaways 1040 allow for less turbulent flow to enhance coagulation. Periodic gentle bends 1060 introduce and maintain additional turbulent flow and introduce flow vortices to periodically mix the flowing solution. In one case, the serpentine mixing array allows for a decrease in flow velocity for 2-8 minutes allowing for sufficient pre-reaction time. Design of the array needs to consider maintaining sufficient flow to prevent deposition of precipitation solids in the pre-reactor assembly. The actual length and diameter of serpentine piping 960 for most applications will result for an optimization of the required reaction time (usually 1-5 minutes), the desired flow rate, the space available at the site of deployment, and the presence of competing reactions in the treatment water.

Phosphorus exists in waters and wastewaters as dissolved ortho-phosphate, polyphosphate and complex organic-phosphorus compounds. In typical phosphorus containing wastewaters, such as the secondary or tertiary effluents of municipal wastewater treatment plants, there is a dissolved fraction, primarily as ortho-phosphate ($PO_4^{3-}$) and poly-phosphates and as a micro-particulate or suspended fraction of phosphorus containing solids. Trace levels of arsenic are sometimes found in some sources of drinking water and in higher concentrations in some wastewaters. Arsenic can occur in natural waters in the reduced arsenite, As(III) or oxidized arsenate, As(V) forms. Arsenate reacts with iron and aluminum salts to form insoluble compounds. Waters with arsenite contamination can be treated with an oxidizer such as chlorine to allow for further reaction with reactive metal salts. Ferric chloride or sulfate is typically used as a metal salt reagent to remove phosphorus and arsenic from water, although other salts and ferrous compounds can be used. These metal salts can react with other contaminants in solution either by physical means (coagulation, flocculation) or by direct or indirect chemical reaction.

For phosphorus, ferric chloride can be added at a molar ratio of 5:1 to 40:1 with the phosphorus in the wastewater. The pre-reactor system allows for a pre-reaction to form metal phosphate salts such as $FePO_4$, Vivianite and humic-fulvic organic phosphorus solids that are amenable to filtration in the sand bed reactive filter system. Vivianite is a very thermodynamically stable compound that is rapidly formed in solutions of iron cations and phosphate. Excess iron salt reagent is passed unreacted into the sand bed where it binds to the surface of the sand to form iron coated sand, a phosphate and polyphosphate reactive surface. Metal cations will selectively bind to the silicate and other negatively charged groups on the solid sand surface. This binding will yield a partially charged cationic boundary layer on the iron coated sand surface that will be reactive with soluble ortho-phosphate and poly-phosphate. The mobile phase (treatment water) and stationary phase (iron coated sand) configuration of this process allows for near quantitative removal of phosphorus because diffusion processes are nearly eliminated in the dilute solution reactive pathway of this process. Testing has shown that this process can remove ortho-phosphate to less than detection limits (10 part per billion) at efficiencies greater than 99% and total phosphorus to less than 40 parts per billion at greater than 90% efficiency of removal from the original concentration.

The processes described above have been shown to produce iron arsenic solids that are classified non-hazardous by the Toxicity Characteristic Leaching Procedure (TCLP) directed by the Resource Conservation and Recovery Act (RCRA 42 U.S.C. s/s 6901 et seq.) and can be disposed in a landfill, and iron phosphate solids that may be used in agricultural applications as a low grade slow release fertilizer.

In some implementations, ozone is mixed with the pre-treated wastewater at ozone inlet port 1090 or alternately at the beginning of serpentine piping 960. This can be followed by venting or vacuum treatment of any headspace formed by excess gas from the ozonation process as large quantities of gas bubbles entering the sand filter may not be desirable. The pre-treated ozonated wastewater flows into a vertically oriented cylindrical treatment vessel 1100 of reactive filtration system 940 through an inlet pipe 1120. Inlet pipe 1120 is positioned at the center of vessel 1100. Vessel 1100 includes a filter chamber 1140 that contains a bed of sand 1160 or another suitable filter media. Inlet pipe 1120 extends down into filter chamber 1140 to discharge the wastewater into the lower portion of sand bed 1160 through a perforated manifold 1180. Wastewater pumped into filter chamber 1140 passes up through sand 1160, over a baffle 1200 near the top of filter chamber 1140 as fully treated water, into a basin 1220 and is removed from vessel 1100 through an outlet pipe 1240.

A recirculation tube 1260 extends from the bottom to the top of filter chamber 1140 at the center of vessel 1100. Inlet pipe 1120 extends down the center of recirculation tube 1260. Inlet flow discharge manifold 1180 extends out through openings in recirculation tube 1260. An air compressor 1280 pumps air into used sand and water at the bottom of vessel 1100 through an air inlet pipe 1290. The aerated mixture of used sand and water rises through recirculation tube 1260 along with contaminants removed from the wastewater up to a sand and particulate/water separator 1300. Separator 1300 represents generally any suitable separation device that may use, for example, physical separation, gravity separation, particle size separation, magnetic separation, membrane separation, or cyclonic separation. The sand removed from the mix by separator 1300 is recycled back to filter chamber 1140. The now highly contaminated wastewater is removed through a sludge removal port 1340. The sludge removal port 1340 can be connected to waste carrying mechanisms (i.e., pipes, tubing, troughs, etc. to facilitate recycling of the wastewater or rejects to an upstream point in the system. Sand 1160 moves continuously down through vessel 1100 under the influence of gravity.

The reactive filter media are deployed in a moving bed to assist in continuous renewal of the reactive iron oxide layer. Movement may be accomplished, for example, by fluidizing or moving the bed using the fluid flow, by mechanical action such as augers or mixing bars, by acoustic action such as the application of ultrasonic waves or by physical transport using compressed air.

Other reactive filtration embodiments can be utilized. For example, the filter media can be any natural or synthetic, organic or inorganic substrate that can react with dissolved iron to form a reactive oxide surface. The particle size of the filter media will be a size suitable for the level of filtration and flow desired. It is expected that the following inorganic materials will provide suitable filtration media: sand; silica beads or granules; high silicate glass; glass beads; glass sand; zeolite; mineral sands such as olivine, hematite, goethite; diatomaceous earth; iron oxyhydroxide granules; iron oxide granules; ceramic beads or granules; iron metal granules or beads; iron metal coated beads or granules; and synthetic or natural iron coated sand. It is expected that the following organic materials will provide suitable filtration media: polystyrene beads; polyethylene beads; modified cationic surface polymer beads; modified anionic surface polymer beads; mixed or pure polymer beads or granules; and polymer coated inorganic beads or granules. Some of these materials can have naturally occurring reactive sites that can be maintained or supplemented by the addition of active reagents such as ferric chloride solution. Because of the well known filtration properties of sand, its inexpensive use, its routine application in water treatment, its natural reactive silicate surface for inner sphere and outer sphere metal oxide binding to form iron oxide coated sand, and its abrasion properties, it is a preferred embodiment of an active filtration media in a moving bed process.

Suitable filtration media include corroding iron metal granules or ion exchange resins with the ability to bind iron compounds. Corroding iron metal granules allow for reductive processes that can be used to remove trace amounts of chlorinated solvents in water. Testing has shown that a 30% by volume iron-sand bed deployed in the system of FIG. 8 has a solution oxidation-reduction potential of −200 mV versus the standard hydrogen electrode. Typical deployments of static beds of iron granules or iron granules and sand suffer from loss of porosity or passivation of the reactive iron metal surface. The motion of a moving bed deployment allows for a continual refreshing of the iron metal surface and its associated chemically reactive sites as well as maintenance of filtration ability. A 98% efficiency has been demonstrated for removing phosphorus from contaminated discharge water originally containing 2 to 3 parts per million phosphorus.

In some circumstances, removing arsenic for example, it may be desirable to pre-oxidize the wastewater to convert arsenite to the iron reactive arsenate. Arsenite in natural solutions at circumneutral pH is non-ionic and therefore typically non-reactive in most treatment deployments. Pre-oxidation can be accomplished using conventional water oxidation operations such as chlorination, sonication or ozonation. The pre-oxidation operation can be part of a full water treatment process train and may be preceded or followed by other conventional water treatment processes such as filtration, aeration, chemical treatment, flocculation, clarification and others that may be required in the normal processing and disinfection of drinking water.

In the system described above, excess ferric iron enters sand bed 1160 along with the particulate Fe—As or Fe—P solids and residual As or P in solution in the wastewater. Ferric ions react with sand surfaces to form iron oxide coated sand (IOCS). IOCS sorbs residual solution As/P out of solution. The physical action of the moving sand abrades the surface of the sand granules, refreshing active sites for additional IOCS formation and Fe—As or Fe—P reactions. Hence, fresh reactive sites for As/P binding are continually presented to the flowing water via microscopic erosion of the sand surface. In implementations that employ ozone, the ozone will oxidize any reduced As(III) to As(IV) making it more reactive with iron compounds. Ozone and the related solution oxidants will also destroy organic contaminants and lead to disinfection.

Chemical and microbial contamination enters water through natural and anthropogenic means and removing such contamination makes water suitable for a variety of uses including drinking water and return of wastewater to natural water bodies. Oxidation can convert contaminating chemical compounds to their mineralized forms such as the products of carbon dioxide and water from hydrocarbon chemicals. Applying simultaneous multiple oxidation modes such as ozonation, metal oxide catalytic ozonation, surface adsorbed ozonation and ultrasonic or hydrodynamic cavitation with ozone can increase the total number and chemical diversity of the oxidants available thus increasing the likelihood of complete mineralization, even for recalcitrant or refractory compounds. This has direct application reducing the concentration of highly toxic or highly bioactive substances in water via enhanced oxidation. Examples of highly bioactive substance in wastewater are pharmaceuticals and hormonally active compounds. Concomitantly, the enhanced oxidation has the desirable effect of enhancing the completeness of disinfection of water contaminated with infectious disease agents such as bacteria and viruses.

Exemplary Method

Figure 10:
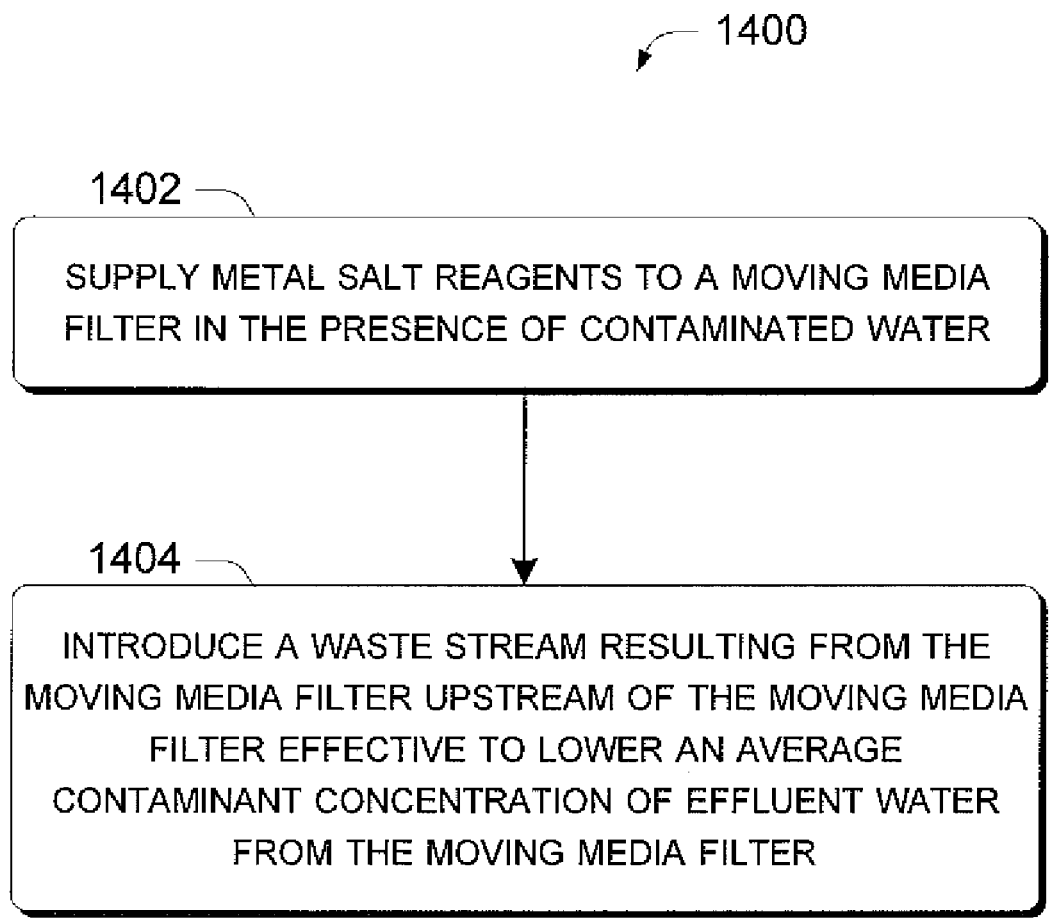
FIG. 10 is a flow diagram of an exemplary method for contaminant removal from a water stream in accordance with one embodiment.

FIG. 10 shows an exemplary process or method 1400 for removing contaminants from a water stream.

At block 1402, a metal salt reagent(s) are supplied to a moving media filter in the presence of contaminated water. Examples of metal salt reagents include iron containing compounds such as ferric chloride. Other examples include various metals, metal salts, metal compounds, or combinations thereof, including iron, aluminum, manganese, zinc, copper, magnesium, and calcium, among others, with further examples described above.

Examples of moving media filters include upflow media filters, such as those illustrated in FIGS. 8-9. Other media filters could alternatively be employed. For instance, various moving bed or static bed, upflow or downflow, gravity or pressure filters, with either coagulation-filtration, ion exchange, or adsorption-based removal mechanisms for contaminant removal could be employed among others in various embodiments. The metal salt reagents can be introduced into the contaminated water before the water reaches the moving media filter or the metal salt reagents can be directly introduced at the moving media filter. In some cases, the metal salt reagents are added to the water effective to generally continually regenerate metal salt reagents on media surfaces while the water flows over the media. The moving media causes metal salt reagents that may or may not be bound to contaminants to be scoured from surfaces of the media. The added metal salt reagents can bind to these scoured surfaces while the scoured metal salt reagents and associated contaminants are separated into a waste stream.

At block 1404, a waste stream resulting from the moving media filter is introduced upstream of the moving media filter effective to lower an average contaminant concentration of effluent water from the moving media filter. In some cases, introducing the waste stream upstream of the moving media filter effectively reduces average contaminant concentrations of both influent water received at the moving media filter and effluent water from the moving media filter. Such an example is described in more detail below as well as above in relation to FIGS. 5-7.

In some instances, the waste stream includes metal salt residuals that can be useful to the overall treatment process to increase overall system contaminant removal efficiency and/ or water treatment rate. In some scenarios, the metal salt residuals can be thought of as pre-hydrolyzed metal salts from a perspective of the upstream components that receive the hydrolyzed metal salts in that the metal salts are hydrolyzed prior to receipt by the upstream components. In essence, the metal salt residuals arrive at the upstream components in their active form rather than a pre-cursor form such as a metal salt.

One example where the target contaminant is phosphorus and the metal salt reagent includes iron containing compounds such as ferric chloride is described in more detail below. In this case, it is observed that the iron-containing process residuals such as hydrolyzed iron salts, from tertiary reactive filtration at a wastewater treatment plant are stable with respect to sequestered phosphorus (P) when recycled back to the headwaters of the treatment plant, such as a point in the treatment plant upstream of primary, secondary, or biological treatment. Additionally, data suggest that the untreated iron residuals from the reactive filtration process actually improve normal total phosphorus (TP), total suspended solids (TSS), and biological oxygen demand (BOD) removal in the wastewater plant, by either biological, chemical, or mechanical mechanisms or a combination of mechanisms. Thus, these recycled residual materials stimulate and enhance chemically enhanced primary treatment (CEPT) processes and other preliminary, primary, and secondary processes in typical municipal and other wastewater-treatment plants. Using the reactive-filtration process residuals as a reagent to enhance plant TP, TSS, and BOD removal efficiency is an advantage and improvement over existing approaches.

Operational evidence shows that primary and secondary treatment solids removal is enhanced by tertiary iron residuals addition; this effect is presumed to occur by iron compounds coagulating smaller particles in the 1-5% solids solution that makes up typical raw municipal wastewater. Additional direct reaction of reactive phosphorus as orthophosphate and polyphosphates with the iron solids and dissolved iron cations from recycled tertiary iron residual waste is also possible. The solids removal occurs during normal solids removal by oxidation and clarification in typical wastewater primary/secondary treatment operations. This solids and contaminant removal can occur via stimulation of bioflocculation and granulation, in addition to coagulation and flocculation. In typical wastewater process operation, return activated sludge (RAS) from secondary biological processes to primary processing ensures that the microbial and chemical changes in the treatment train stabilize with respect to microbial innocula and degraded chemical constituents. It is well known that RAS assists in stabilizing overall treatment operations by minimizing process upsets. Iron-modified RAS will preserve and stabilize these changes in total plant operation as well. One of the effects will be the increase in population and activity of iron-reducing bacteria (IRB) in response to ferric iron dosing of the system. IRB are efficient in the biological treatment or uptake of phosphorus, in anaerobic conditions, such as through the following process:

$$4Fe^{3+}+CH_2O+H_2O \rightarrow 4Fe^{2+}+CO_2+4H^+ \quad (1)$$

$$x_1Fe^{2+}+x_2H_2O \rightarrow x_3Fe(OH)^+\downarrow+x_4Fe(OH)_2\downarrow+x_5Fe(OH)_3^-\downarrow+x_6H^+ \quad (2)$$

$$(4-x_1)Fe^{2+}+(4-x_1)HPO_4^{2-} \rightarrow (4-x_1)FeHPO_4\downarrow \quad (3)$$

$$x_3Fe(OH)^+\downarrow+x_3H_2PO_4^- \rightarrow x_3FeHPO_4\downarrow+x_3H_2O \quad (4)$$

where $CH_2O$ denotes a carbon-containing substrate.

In some configurations, the reactive-filtration process, which may work more efficiently at phosphorus influent concentrations less than about 1 mg/L, can use the process residual waste stream to improve plant operations and lower reactive-filtration influent phosphorus levels from high ranges (about 1-10 mg/L) to levels more advantageous for high-efficiency reactive filtration (i.e., less than about 1 mg/L). Standard water-treatment practice of using metal salt reagent addition in several places in the process stream as a coagulant or reactant for contaminant removal and water treatment typically lowers phosphorus levels to about 0.5-1.5 mg/L and has not been demonstrated to yield the very low levels achievable by tertiary reactive filtration (e.g., <0.030 mg/L). The use of the tertiary treatment residuals (i.e., metal salt residuals) to enhance plant TP/TSS/BOD removal, leverage higher-efficiency reactive filtration, and enhance solids management, all while limiting overall reagent chemical addition, is a process improvement.

The productive recycling of tertiary process residuals into primary or secondary wastewater treatment is an improvement to the reactive-filtration process. This recycling manages the residual waste stream of reactive filtration to enhance overall contaminant removal efficiency at a wastewater treatment plant. It is a "green chemistry" recycling application of a process byproduct that normally would be directly removed, often by another unit operation, for disposal as solid waste. For example, U.S. Pat. No. 6,426,005 shows an additional unit operation for treatment of waste streams from a tertiary treatment. This additional unit operation separates the residual waste solids from the process water. However, in this reference, the residual waste solids are not explored or proposed for reuse in the water treatment plant. Therefore, the present application is an improvement to that method. Other water-treatment methods that use metal salts, mixtures, or polymers in separation processes, such as tertiary treatment (e.g., sand or other media filtration, membrane filtration, ultrafiltration, magnetic removal of magnetized iron compounds, or other physical or mechanical methods); secondary processes (e.g., aerobic or anaerobic-suspended growth variations, aerobic or anaerobic attached-growth variations, biological nutrient-removal variations, lagoon systems, septic systems, physical-chemical systems, chemical oxidation, advanced oxidation, membrane filtration, or membrane bioreactors); and primary treatment (e.g., CEPT or primary coagulation and flocculation, grit removal, or sedimentation) may also benefit from immediate reuse and recycling of this metal hydroxide and oxide residual waste stream. This benefit may be a chemical, mechanical, or biological treatment benefit. Thus residual waste-stream reuse to enhance primary and secondary treatment, especially from tertiary treatment residuals, is an improvement on those tertiary treatment methods (membrane reactors and filtration, ultrafiltration, and other physical, mechanical, or chemical methods) especially when the methods use ferric iron to enhance contaminant removal.

The chemical and biological processes in a municipal wastewater treatment plant do not appear to release already sequestered phosphorus that is in the tertiary treatment residual waste stream. This is possibly due to the formation of thermodynamically stable iron phosphate compounds and minerals. Indeed, research has documented stable iron-phosphorus compound formation, and enhanced microbial and chemical processes in ferric iron-treated anaerobic and aerobic water treatment.

Since treatment plants are already optimized for biosolids removal, there is a cost savings to the overall tertiary treatment installation in that no additional solids management unit operations have to be installed. The mass balance of iron being placed into land-applied biosolids is not of concern as typical soils contain 10,000-50,000 mg/kg (i.e. 1-5 wt %) of total iron. The reactive-filtration treatment residuals have additional, unused reactive capacity that can be exploited by adding them back into the water-treatment train. This addition could occur before a primary or secondary treatment solids separation unit operation prior to the reactive-filtration step. Enhancement of contaminant removal efficiency such as the observed reduction in TSS, BOD, and TP before tertiary treatment suggests that an active feedback mechanism may be established wherein reagent ferric iron dosing in a tertiary treatment process is reduced in response to a stable level of ferric iron activity in primary and secondary processes. This reduction in reagent dosing will decrease operational costs. Additionally, the biosolids produced are more compact, dewater more easily, and result in less equipment failure in typical dewatering press operation. This additional improvement in overall plant operation results from recycling the ferric iron process residuals into the primary and secondary wastewater treatment operations.

The process improvement of recycling metal salt residuals from a tertiary and/or advanced treatment process is substantially different than the typical recycle of return activated sludge (RAS) from a clarifier, which may have been dosed with a metal salt reagent, to the biological treatment portion of a treatment plant. Recycle of RAS, even when a metal salt has been dosed, does not achieve the same contaminant removal efficiency as in embodiments of the present application (see e.g. U.S. patent application Ser. No. 10/853,472 entitled "Chemically Enhanced Primary Sludge Fermentation Method"). This may be due to insufficient reaction or release of the contaminant from less well-developed metal salt precipitates (i.e., less hydrolyzed, polymerized, and flocculated metal salts) in the complex competitive-chemistry microenvironment found in primary and secondary water treatment target waters. Indeed, the presence of iron residual solids as iron hydroxides and iron oxides may stimulate bioflocculation, granulation, and IRB activity due to the macroscopic (e.g., about 1-10 mm) solid surface. The addition of a tertiary and/or advanced treatment process is also an advantage since it provides an extra level of protection, or redundancy, from process failures or upsets in other operations in the plant.

Metal salts have been widely used as reagents for treatment of water; however, pre-activation or pre-hydrolysis of the metal is an improvement to the dosing of metal salt reagents to water. Pre-hydrolyzed metal salts such as polyaluminum chloride (PAX) have been produced for commercial use; however, the method of pre-hydrolyzing metal salts for immediate use within a water-treatment plant by using tertiary-treatment process water or side-stream water is an improvement over existing practice.

It is expected that addition of substantial ferric iron into primary and secondary wastewater-treatment processes will activate treatment-plant contact surfaces such as concrete, metal piping or other designed or available surfaces with active IRB biofilms. This activation will be enhanced by the formation of iron oxide coatings on these surfaces. One embodiment of the present application includes creation of additional designed or engineered surfaces in a water-treatment process for iron oxide deposition and subsequent IRB biofilm formation following ferric iron compound addition. These surfaces will typically have a high relative surface area and may be constructed of material of high, neutral, or low density (relative to water; sinking or floating media), that may include plastics, ceramics, gravel, fabrics, metals or other materials intended to provide a stable surface for iron oxide and biofilm development. In other embodiments, it is expected that added and consumable surfaces, usually small (e.g., from less than 1 mm to about 10 mm) and made of an appropriate material, intended to be removed in suspended or settled solids processing of the treatment plant, may be added in the initial stages of treatment as additional surfaces for iron oxide and biofilm development. It is viewed as advantageous that these added surfaces would also be recyclable and/or improve properties of the solids produced in a water-treatment process.

Besides municipal wastewater or sewerage treatment, other water- and wastewater-treatment applications, such as food-processing wastewater or industrial-process wastewater may benefit from this same process. Treatment processes that use metal salts in a solids separation step toward the front of the treatment train, as preliminary or primary treatment, can also be improved by practicing some of the embodiments of the present application as described herein.

In the above detailed description, reference is made to the accompanying drawings that form a part thereof, and in which is shown by way of illustration specific exemplary embodiments in which the inventive concepts may be practiced. These embodiments are described in sufficient detail to enable those skilled in the art to practice the inventive concepts, and it is to be understood that modifications to the various disclosed embodiments may be made, and other embodiments may be utilized, without departing from the spirit and scope of the present invention. The detailed description is, therefore, not to be regarded as limiting in any way.

Unless otherwise indicated, all numbers expressing concentrations of contaminants or reagents, reaction conditions, separation conditions, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. At the very least, and not as an attempt to limit the application of the doctrine of equivalents to the scope of the claims, each numerical parameter should at least be construed in light of the number of reported significant digits and by applying ordinary rounding techniques. The numerical values set forth are reported as precisely as possible. Any numerical value, however, inherently contains certain errors necessarily resulting from the standard deviation found in their respective testing measurements.

In reference to the drawings, it should be understood by one of ordinary skill in the art that the scope of the present application extends beyond the specific embodiments depicted. For example, any of the streams can be diverted in part or in whole to some other part of the process shown, or purged to waste, even though explicit flow arrows may not be included in the FIGS. for certain process options. This application also incorporates routine process experimentation and optimization, comprising adjusting operating conditions, changing the configuration of pipes and valves to modify the split fractions of various process flows, and the like. Generally, process parameters will be chosen to establish an economical operation; parameters will sometimes need to be varied, depending on the contaminant profile in the feed and on the target contaminant-removal efficiency, for example. Those skilled in the art can readily perform such process manipulations without undue experimentation.

CONCLUSION

Although exemplary techniques, methods, devices, systems, etc., relating to contaminant removal from water streams have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method of treating waste water, comprising:
providing an influent stream of waste water containing solids and at least one dissolved contaminant;
subjecting said influent stream to primary treatment to remove some of the solids therefrom and to produce a first treated stream;
subjecting said first treated stream to secondary treatment to remove additional solids therefrom to produce a second treated stream;
adding metal salt reagents to said second treated stream to produce a third treated stream;
subjecting said third treated stream to tertiary treatment to produce a purified effluent stream, wherein said tertiary treatment includes passing said third treated stream over media surfaces;
generally continually regenerating metal salt reagents on the media surfaces while flowing said third treated stream over the media;
separating at least some of said at least one dissolved contaminant as solid contaminants and at least some of the metal salt reagents from said third treated stream in said tertiary treatment, wherein the separated solid contaminants and the at least some of the metal salt reagents are contained in a waste stream, and wherein at an initial point in time the purified effluent stream has a first contaminant concentration of said at least one dissolved contaminant; and,
recycling the waste stream back into said influent stream at a point upstream of said primary treatment, and wherein subsequent to the recycling, at a subsequent point in time, the purified effluent stream has a second contaminant concentration of said at least one dissolved contaminant that is lower than the first contaminant concentration of said at least one dissolved contaminant.

2. The method as recited in claim 1, wherein the separating comprises passing air through the media sufficient to move at least some of the media effective that the media surfaces of the at least some of the media are scoured against the media surfaces of other of the media.

3. The method as recited in claim 2, wherein the scouring removes derivatives of the metal salt reagents from the surfaces.

4. The method as recited in claim 1, wherein the metal salt reagents include iron containing materials and wherein the generally continually regenerating comprises supplying sufficient metal salt reagents to form iron oxide on the media surfaces.

5. The method as recited in claim 1, wherein the generally continually regenerating metal salt reagents on the media surfaces comprises regeneration of adsorptive media.

* * * * *